United States Patent
Li et al.

(10) Patent No.: US 8,750,261 B2
(45) Date of Patent: Jun. 10, 2014

(54) ENCODING BEACON SIGNALS TO PROVIDE IDENTIFICATION IN PEER-TO-PEER COMMUNICATION

(75) Inventors: Junyi Li, Bedminster, NJ (US); Rajiv Laroia, Far Hills, NJ (US); Xinzhou Wu, Monmouth Junction, NJ (US); Tom Richardson, South Orange, NJ (US)

(73) Assignee: QUALCOMM Incorporated, San Diego, CA (US)

(*) Notice: Subject to any disclaimer, the term of this patent is extended or adjusted under 35 U.S.C. 154(b) by 772 days.

(21) Appl. No.: 11/621,975

(22) Filed: Jan. 10, 2007

(65) Prior Publication Data
US 2007/0211678 A1 Sep. 13, 2007

Related U.S. Application Data

(60) Provisional application No. 60/758,010, filed on Jan. 11, 2006, provisional application No. 60/758,011, filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(51) Int. Cl.
*H04W 4/00* (2009.01)

(52) U.S. Cl.
USPC ........... 370/338; 370/350; 370/343; 370/328; 370/252; 370/465; 455/456.6; 455/41.2; 455/456.1; 713/168

(58) Field of Classification Search
USPC .......................................................... 370/338
See application file for complete search history.

(56) References Cited

U.S. PATENT DOCUMENTS 2,972,743 A 2/1961 Svensson et al.
5,216,693 A 6/1993 Nakamura
(Continued)

FOREIGN PATENT DOCUMENTS

CN 1310927 A 8/2001
CN 1327354 A 12/2001
(Continued)

OTHER PUBLICATIONS

Ari Juels and John Brainard: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].

(Continued)

*Primary Examiner* — Dwayne Bost
*Assistant Examiner* — Gerald Johnson
(74) *Attorney, Agent, or Firm* — James K. O'Hare

(57) ABSTRACT

Systems and methodologies are described that facilitate encoding and/or decoding signals utilized to identify a wireless terminal during peer discovery interval(s). Substantially any type of function that constrains encoding and/or decoding within a peer-to-peer network may be utilized. For example, a reversible function may be employed that enables a receiving peer to discern an identifier of a transmitting peer over a series of peer discovery intervals. Pursuant to another example, an irreversible function may be utilized whereby a receiving peer may be unable to decipher the identifier of the transmitting peer from a received signal; however, expected signal formats of buddy peers may be compared to the received signal to determine a presence of one of the buddy peers in a vicinity.

40 Claims, 17 Drawing Sheets

(56) References Cited

U.S. PATENT DOCUMENTS

| | | |
|---|---|---|
| 5,233,627 A | 8/1993 | Kozima et al. |
| 5,535,425 A | 7/1996 | Watanabe |
| 5,701,589 A | 12/1997 | Lee et al. |
| 5,726,893 A | 3/1998 | Schuchman et al. |
| 5,754,542 A | 5/1998 | Ault et al. |
| 5,805,575 A | 9/1998 | Kamin, Jr. |
| 5,818,871 A | 10/1998 | Blakeney, II et al. |
| 5,839,074 A | 11/1998 | Plehn |
| 5,844,900 A | 12/1998 | Hong et al. |
| 5,852,780 A | 12/1998 | Wang et al. |
| 5,903,618 A | 5/1999 | Miyake |
| 5,953,323 A | 9/1999 | Haartsen |
| 5,991,639 A | 11/1999 | Rautiola et al. |
| 5,995,500 A | 11/1999 | Ma |
| 5,995,844 A | 11/1999 | Fukuda |
| 6,011,515 A | 1/2000 | Radcliffe et al. |
| 6,047,178 A | 4/2000 | Frlan |
| 6,175,747 B1 | 1/2001 | Tanishima et al. |
| 6,230,012 B1 | 5/2001 | Willkie et al. |
| 6,377,608 B1 | 4/2002 | Zyren |
| 6,389,062 B1 | 5/2002 | Wu |
| 6,473,418 B1 | 10/2002 | Laroia et al. |
| 6,545,997 B1 | 4/2003 | Bohnke et al. |
| 6,574,266 B1 | 6/2003 | Haartsen |
| 6,580,981 B1 | 6/2003 | Masood et al. |
| 6,609,010 B1 | 8/2003 | Dolle et al. |
| 6,611,507 B1 | 8/2003 | Hottinen et al. |
| 6,650,629 B1 | 11/2003 | Takahashi et al. |
| 6,671,525 B2 | 12/2003 | Allen et al. |
| 6,725,058 B2 | 4/2004 | Rinne et al. |
| 6,728,232 B2 | 4/2004 | Hasty, Jr. et al. |
| 6,735,448 B1 | 5/2004 | Krishnamurthy et al. |
| 6,741,836 B2 | 5/2004 | Lee et al. |
| 6,744,743 B2 | 6/2004 | Walton et al. |
| 6,760,599 B1 | 7/2004 | Uhlik |
| 6,763,013 B2 | 7/2004 | Kennedy |
| 6,771,963 B1 | 8/2004 | Cheng et al. |
| 6,859,463 B1 | 2/2005 | Mayor et al. |
| 6,882,632 B1 | 4/2005 | Koo et al. |
| 6,882,851 B2 | 4/2005 | Sugar et al. |
| 6,920,171 B2 | 7/2005 | Souissi et al. |
| 6,922,388 B1 | 7/2005 | Laroia et al. |
| 6,934,299 B2 | 8/2005 | Kaatz |
| 6,940,827 B2 | 9/2005 | Li et al. |
| 6,940,843 B2 | 9/2005 | Goodall et al. |
| 6,975,600 B1 | 12/2005 | Vaughan et al. |
| 6,975,855 B1 | 12/2005 | Wallenius |
| 6,982,987 B2 | 1/2006 | Cain |
| 6,985,087 B2 | 1/2006 | Soliman |
| 6,990,087 B2 | 1/2006 | Rao et al. |
| 7,006,451 B2 | 2/2006 | Kuwahara |
| 7,013,145 B1 | 3/2006 | Centore, III |
| 7,016,649 B1 | 3/2006 | Narasimhan et al. |
| 7,019,616 B2 | 3/2006 | Fernandez |
| 7,027,409 B2 | 4/2006 | Cain |
| 7,035,221 B2 | 4/2006 | Furukawa et al. |
| 7,039,372 B1 | 5/2006 | Sorrells et al. |
| 7,072,650 B2 | 7/2006 | Stanforth |
| 7,092,391 B2 | 8/2006 | Umeda |
| 7,130,368 B1 | 10/2006 | Aweya et al. |
| 7,133,697 B2 | 11/2006 | Judd et al. |
| 7,136,655 B2 | 11/2006 | Skafidas et al. |
| 7,146,130 B2 | 12/2006 | Hsu et al. |
| 7,164,885 B2 * | 1/2007 | Jonsson et al. ............... 455/41.2 |
| 7,167,463 B2 | 1/2007 | Alapuranen |
| 7,174,187 B1 | 2/2007 | Ngan |
| 7,180,884 B2 | 2/2007 | Elliott et al. |
| 7,218,689 B2 | 5/2007 | Gupta |
| 7,224,954 B2 | 5/2007 | Okajima et al. |
| 7,228,138 B2 * | 6/2007 | Hansson et al. ........... 455/456.1 |
| 7,233,602 B2 | 6/2007 | Chen et al. |
| 7,246,235 B2 * | 7/2007 | Ellison et al. ................. 713/168 |
| 7,248,570 B2 | 7/2007 | Bahl et al. |
| 7,260,399 B1 | 8/2007 | Oh et al. |
| 7,269,169 B1 | 9/2007 | Venkataraman et al. |
| 7,280,467 B2 | 10/2007 | Smee et al. |
| 7,280,810 B2 | 10/2007 | Feher |
| 7,313,628 B2 | 12/2007 | Chaskar et al. |
| 7,333,829 B2 | 2/2008 | Malone et al. |
| 7,336,626 B1 | 2/2008 | Barratt et al. |
| 7,336,927 B2 | 2/2008 | Diaz Cervera et al. |
| 7,339,883 B2 | 3/2008 | Santhoff et al. |
| 7,342,834 B2 | 3/2008 | Ishibashi |
| 7,342,896 B2 | 3/2008 | Ayyagari |
| 7,352,733 B2 | 4/2008 | Green |
| 7,378,953 B2 | 5/2008 | Coronel et al. |
| 7,388,845 B2 | 6/2008 | Laroia et al. |
| 7,401,224 B2 | 7/2008 | Gantman et al. |
| 7,426,396 B2 | 9/2008 | Iwasaki et al. |
| 7,440,754 B2 | 10/2008 | Bahl et al. |
| 7,457,646 B2 | 11/2008 | Mahany et al. |
| 7,477,897 B2 | 1/2009 | Bye |
| 7,493,149 B1 | 2/2009 | Doyle et al. |
| 7,502,341 B2 | 3/2009 | Matoba et al. |
| 7,512,096 B2 | 3/2009 | Kuzminskiy et al. |
| 7,545,771 B2 | 6/2009 | Wentink et al. |
| 7,548,758 B2 | 6/2009 | Periyalwar et al. |
| 7,570,627 B2 | 8/2009 | Welborn et al. |
| 7,570,969 B2 | 8/2009 | Hwang et al. |
| 7,586,881 B2 | 9/2009 | Hansen et al. |
| 7,590,183 B2 | 9/2009 | Yonge, III |
| 7,613,426 B2 * | 11/2009 | Kuehnel et al. ............... 455/41.2 |
| 7,626,975 B2 | 12/2009 | Colban et al. |
| 7,653,011 B2 | 1/2010 | Rahman et al. |
| 7,657,276 B2 | 2/2010 | Sakoda |
| 7,660,595 B2 | 2/2010 | Ramaswamy et al. |
| 7,664,055 B2 | 2/2010 | Nelson |
| 7,664,130 B2 | 2/2010 | Sakoda et al. |
| 7,720,029 B2 | 5/2010 | Orava et al. |
| 7,720,172 B2 | 5/2010 | Nakagawa et al. |
| 7,724,713 B2 | 5/2010 | Del Prado Pavon et al. |
| 7,729,240 B1 * | 6/2010 | Crane et al. ................... 370/229 |
| 7,756,521 B2 | 7/2010 | Gerlach et al. |
| 7,925,010 B2 | 4/2011 | Sannino et al. |
| 8,498,237 B2 | 7/2013 | Corson et al. |
| 8,504,099 B2 | 8/2013 | Corson et al. |
| 8,542,658 B2 | 9/2013 | Laroia et al. |
| 2002/0077124 A1 * | 6/2002 | Hunzinger .................... 455/456 |
| 2002/0105970 A1 | 8/2002 | Shvodian |
| 2002/0128049 A1 | 9/2002 | Davis |
| 2002/0131121 A1 | 9/2002 | Jeganathan et al. |
| 2002/0131386 A1 | 9/2002 | Gwon |
| 2002/0193945 A1 | 12/2002 | Tan et al. |
| 2002/0196771 A1 | 12/2002 | Vij et al. |
| 2002/0196844 A1 | 12/2002 | Rafie et al. |
| 2003/0002482 A1 | 1/2003 | Kubler et al. |
| 2003/0007473 A1 | 1/2003 | Strong et al. |
| 2003/0012188 A1 | 1/2003 | Zelig et al. |
| 2003/0054818 A1 | 3/2003 | Bahl |
| 2003/0063655 A1 | 4/2003 | Young |
| 2003/0069035 A1 | 4/2003 | Shurvinton |
| 2003/0078031 A1 | 4/2003 | Masuda |
| 2003/0078037 A1 | 4/2003 | Auckland et al. |
| 2003/0108016 A1 | 6/2003 | Bonta |
| 2003/0128659 A1 | 7/2003 | Hirsch |
| 2003/0142631 A1 | 7/2003 | Silvester |
| 2003/0145064 A1 | 7/2003 | Hsu et al. |
| 2003/0169697 A1 | 9/2003 | Suzuki et al. |
| 2003/0217266 A1 | 11/2003 | Epp et al. |
| 2004/0005904 A1 | 1/2004 | Wolf et al. |
| 2004/0008661 A1 | 1/2004 | Myles |
| 2004/0009781 A1 | 1/2004 | Andrews et al. |
| 2004/0028003 A1 | 2/2004 | Diener |
| 2004/0032536 A1 | 2/2004 | Islam et al. |
| 2004/0047324 A1 | 3/2004 | Diener |
| 2004/0057400 A1 | 3/2004 | Walsh et al. |
| 2004/0063458 A1 | 4/2004 | Hori |
| 2004/0064568 A1 | 4/2004 | Arora |
| 2004/0067773 A1 | 4/2004 | Rachabathuni et al. |
| 2004/0072558 A1 | 4/2004 | Van Bosch |
| 2004/0077346 A1 | 4/2004 | Krenik et al. |
| 2004/0077366 A1 | 4/2004 | Panasik et al. |
| 2004/0081117 A1 | 4/2004 | Malek et al. |
| 2004/0082326 A1 | 4/2004 | Shaw et al. |

(56) References Cited

U.S. PATENT DOCUMENTS

| | | |
|---|---|---|
| 2004/0082356 A1 | 4/2004 | Walton et al. |
| 2004/0090924 A1 | 5/2004 | Giaimo |
| 2004/0095902 A1 | 5/2004 | Laroia et al. |
| 2004/0095904 A1 | 5/2004 | Laroia et al. |
| 2004/0109432 A1* | 6/2004 | Laroia et al. ............ 370/343 |
| 2004/0114521 A1 | 6/2004 | Sugaya |
| 2004/0125776 A1 | 7/2004 | Haugli et al. |
| 2004/0125778 A1 | 7/2004 | Lin et al. |
| 2004/0127204 A1 | 7/2004 | Belmont |
| 2004/0127214 A1 | 7/2004 | Reddy |
| 2004/0127240 A1 | 7/2004 | Li |
| 2004/0133689 A1 | 7/2004 | Vasisht |
| 2004/0145604 A1 | 7/2004 | Min |
| 2004/0147223 A1 | 7/2004 | Cho |
| 2004/0152464 A1 | 8/2004 | Sugaya |
| 2004/0162871 A1 | 8/2004 | Pabla et al. |
| 2004/0165563 A1 | 8/2004 | Hsu et al. |
| 2004/0176059 A1 | 9/2004 | Hayem et al. |
| 2004/0190483 A1 | 9/2004 | Shahaf et al. |
| 2004/0203762 A1 | 10/2004 | Liu et al. |
| 2004/0204850 A1 | 10/2004 | MacNeille |
| 2004/0240401 A1 | 12/2004 | Willenegger et al. |
| 2004/0240405 A1 | 12/2004 | Okazaki |
| 2004/0240476 A1 | 12/2004 | Joshi |
| 2004/0249448 A1 | 12/2004 | Gault |
| 2004/0258006 A1 | 12/2004 | An |
| 2004/0259529 A1 | 12/2004 | Suzuki |
| 2005/0009578 A1 | 1/2005 | Liu |
| 2005/0025092 A1 | 2/2005 | Morioka |
| 2005/0037754 A1 | 2/2005 | Liu et al. |
| 2005/0058102 A1 | 3/2005 | Santhoff et al. |
| 2005/0058117 A1 | 3/2005 | Morioka et al. |
| 2005/0058229 A1 | 3/2005 | Alagha |
| 2005/0060535 A1 | 3/2005 | Bartas |
| 2005/0063344 A1 | 3/2005 | Winzell |
| 2005/0063416 A1 | 3/2005 | Shin et al. |
| 2005/0068934 A1 | 3/2005 | Sakoda |
| 2005/0075118 A1 | 4/2005 | Lewis et al. |
| 2005/0085190 A1 | 4/2005 | Nishikawa |
| 2005/0085214 A1 | 4/2005 | Laroia |
| 2005/0088980 A1 | 4/2005 | Olkkonen et al. |
| 2005/0090266 A1 | 4/2005 | Sheynblat |
| 2005/0105491 A1 | 5/2005 | Chaskar et al. |
| 2005/0111397 A1 | 5/2005 | Attar et al. |
| 2005/0117525 A1 | 6/2005 | Poustchi |
| 2005/0117530 A1 | 6/2005 | Abraham |
| 2005/0128991 A1 | 6/2005 | Dayanandan et al. |
| 2005/0129221 A1 | 6/2005 | Dickens et al. |
| 2005/0135295 A1 | 6/2005 | Walton |
| 2005/0143119 A1 | 6/2005 | Chandra et al. |
| 2005/0152280 A1* | 7/2005 | Pollin et al. ............ 370/252 |
| 2005/0153736 A1 | 7/2005 | Ganton |
| 2005/0157660 A1 | 7/2005 | Mandato et al. |
| 2005/0176371 A1 | 8/2005 | Palin et al. |
| 2005/0177639 A1 | 8/2005 | Reunamaki |
| 2005/0185669 A1* | 8/2005 | Welborn et al. ............ 370/465 |
| 2005/0201308 A1 | 9/2005 | Sekiya et al. |
| 2005/0210157 A1 | 9/2005 | Sakoda |
| 2005/0220201 A1 | 10/2005 | Laroia et al. |
| 2005/0226175 A1 | 10/2005 | Gupta |
| 2005/0226207 A1* | 10/2005 | Sharma ............ 370/350 |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0250469 A1 | 11/2005 | Laroia et al. |
| 2005/0254435 A1 | 11/2005 | Moakley et al. |
| 2005/0259607 A1* | 11/2005 | Xiong et al. ............ 370/328 |
| 2005/0265218 A1 | 12/2005 | Molisch et al. |
| 2005/0265221 A1 | 12/2005 | Batra et al. |
| 2005/0276243 A1 | 12/2005 | Sugaya et al. |
| 2005/0281320 A1 | 12/2005 | Neugebauer |
| 2005/0286477 A1 | 12/2005 | Gupta et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1 | 1/2006 | Hamnen |
| 2006/0023686 A1 | 2/2006 | Jeong et al. |
| 2006/0025151 A1 | 2/2006 | Karaoguz et al. |
| 2006/0031583 A1 | 2/2006 | Fujii et al. |
| 2006/0034315 A1 | 2/2006 | Maekawa et al. |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |
| 2006/0111104 A1 | 5/2006 | Hyslop |
| 2006/0114853 A1 | 6/2006 | Hasty, Jr. et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0251033 A1* | 11/2006 | Oprescu-Surcobe et al. 370/338 |
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0282253 A1 | 11/2009 | Rose et al. |

(56) References Cited

U.S. PATENT DOCUMENTS

| | | | |
|---|---|---|---|
| 2009/0296669 A1 | 12/2009 | Uchiyama et al. | |
| 2010/0128652 A1 | 5/2010 | Lee et al. | |
| 2013/0343283 A1 | 12/2013 | Laroia | |

FOREIGN PATENT DOCUMENTS

| | | |
|---|---|---|
| CN | 1371583 A | 9/2002 |
| CN | 1397117 A | 2/2003 |
| CN | 1411237 | 4/2003 |
| CN | 1578314 A | 2/2005 |
| CN | 1596005 A | 3/2005 |
| CN | 1650594 A | 8/2005 |
| CN | 1663156 | 8/2005 |
| CN | 1689345 A | 10/2005 |
| CN | 1909386 A | 2/2007 |
| EP | 0776134 A2 | 5/1997 |
| EP | 0848567 A1 | 6/1998 |
| EP | 0969602 A1 | 1/2000 |
| EP | 1089586 A1 | 4/2001 |
| EP | 1119137 A1 | 7/2001 |
| EP | 1241838 A2 | 9/2002 |
| EP | 1326386 A1 | 7/2003 |
| EP | 1408651 A1 | 4/2004 |
| EP | 1469659 A1 | 10/2004 |
| EP | 1496668 | 1/2005 |
| EP | 1549094 A1 | 6/2005 |
| EP | 1562333 | 8/2005 |
| EP | 1566944 | 8/2005 |
| EP | 1592176 | 11/2005 |
| EP | 1670183 A1 | 6/2006 |
| EP | 1895714 A1 | 3/2008 |
| EP | 2312885 A1 | 4/2011 |
| GB | 232251 A1 | 3/1926 |
| GB | 2375014 A1 | 10/2002 |
| GB | 2410653 A | 8/2005 |
| JP | 7023465 | 1/1995 |
| JP | 07143567 | 6/1995 |
| JP | 8307934 A | 11/1996 |
| JP | 9107583 | 4/1997 |
| JP | 10013324 | 1/1998 |
| JP | 11289583 A | 10/1999 |
| JP | 11355291 | 12/1999 |
| JP | 2001069060 A | 3/2001 |
| JP | 2001069557 A | 3/2001 |
| JP | 2002502164 A | 1/2002 |
| JP | 2002112347 | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 | 1/2003 |
| JP | 2003143644 A | 5/2003 |
| JP | 2003158525 A | 5/2003 |
| JP | 2003249939 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004242187 A | 8/2004 |
| JP | 2004247820 A | 9/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |
| JP | 2005086234 A | 3/2005 |
| JP | 2005086408 | 3/2005 |
| JP | 2005124121 A | 5/2005 |
| JP | 2005136529 A | 5/2005 |
| JP | 2005151525 A | 6/2005 |
| JP | 2005167502 A | 6/2005 |
| JP | 2005210703 A | 8/2005 |
| JP | 2005223722 A | 8/2005 |
| JP | 2005223767 A | 8/2005 |
| JP | 2005523616 A | 8/2005 |
| JP | 2005236819 A | 9/2005 |
| JP | 2005244698 A | 9/2005 |
| JP | 2005252645 A | 9/2005 |
| JP | 2005253047 A | 9/2005 |
| JP | 2005277599 A | 10/2005 |
| JP | 2005277815 A | 10/2005 |
| JP | 2005295400 | 10/2005 |
| JP | 2005328231 | 11/2005 |
| JP | 2005348203 | 12/2005 |
| JP | 2005354326 A | 12/2005 |
| JP | 2005537762 T | 12/2005 |
| JP | 2006005792 A | 1/2006 |
| JP | 2006501777 A | 1/2006 |
| JP | 2007509531 A | 4/2007 |
| JP | 2007525891 A | 9/2007 |
| JP | 2007533256 | 11/2007 |
| JP | 2008507219 T | 3/2008 |
| JP | 2008228128 A | 9/2008 |
| JP | 4927869 | 2/2012 |
| KR | 960012088 B1 | 9/1996 |
| KR | 100225765 B1 | 10/1999 |
| KR | 20000035806 A | 6/2000 |
| KR | 20000076038 | 12/2000 |
| KR | 10362135 | 11/2002 |
| KR | 20030024435 A | 3/2003 |
| TW | 540210 B | 7/2003 |
| TW | 545006 B | 8/2003 |
| TW | I230525 | 4/2005 |
| TW | I239782 | 9/2005 |
| TW | 286515 | 1/2006 |
| TW | I250742 | 3/2006 |
| TW | M292848 | 6/2006 |
| WO | WO9701256 A1 | 1/1997 |
| WO | WO9749258 A1 | 12/1997 |
| WO | WO9808321 | 2/1998 |
| WO | 9839938 A2 | 9/1998 |
| WO | WO0074429 | 12/2000 |
| WO | WO0101717 A1 | 1/2001 |
| WO | 0192992 A2 | 12/2001 |
| WO | 0223758 | 3/2002 |
| WO | WO0249387 A1 | 6/2002 |
| WO | 02078271 A1 | 10/2002 |
| WO | 02082742 A1 | 10/2002 |
| WO | WO-02091623 A1 | 11/2002 |
| WO | WO03001742 | 1/2003 |
| WO | 03017596 A2 | 2/2003 |
| WO | 03039054 | 5/2003 |
| WO | WO03090037 A2 | 10/2003 |
| WO | 2004012464 A2 | 2/2004 |
| WO | 2004019529 A2 | 3/2004 |
| WO | WO2004023241 A2 | 3/2004 |
| WO | 2004032536 A2 | 4/2004 |
| WO | WO2004047348 A1 | 6/2004 |
| WO | WO2004066646 A1 | 8/2004 |
| WO | WO2004071022 A1 | 8/2004 |
| WO | 2004080103 A1 | 9/2004 |
| WO | WO2004077920 A2 | 9/2004 |
| WO | WO2005013529 A2 | 2/2005 |
| WO | 2005022846 A1 | 3/2005 |
| WO | WO2005020517 | 3/2005 |
| WO | WO2005027556 A1 | 3/2005 |
| WO | 2005038606 A2 | 4/2005 |
| WO | 2005039105 A1 | 4/2005 |
| WO | WO2005034433 A1 | 4/2005 |
| WO | WO2005039128 | 4/2005 |
| WO | 2005053346 A1 | 6/2005 |
| WO | 2005053347 A1 | 6/2005 |
| WO | WO2005053253 | 6/2005 |

(56) References Cited

FOREIGN PATENT DOCUMENTS

| WO | WO2005055527 | | 6/2005 |
|---|---|---|---|
| WO | WO2005060209 | A1 | 6/2005 |
| WO | WO2005062552 | A1 | 7/2005 |
| WO | 2005071998 | A1 | 8/2005 |
| WO | 2005076543 | A1 | 8/2005 |
| WO | WO2005079012 | A1 | 8/2005 |
| WO | 2005109657 | A1 | 11/2005 |
| WO | WO2005109916 | | 11/2005 |
| WO | WO2005109917 | A1 | 11/2005 |
| WO | 2005117463 | A1 | 12/2005 |
| WO | WO2005119478 | | 12/2005 |
| WO | 2006000617 | A1 | 1/2006 |
| WO | 2006007946 | A1 | 1/2006 |
| WO | WO2006057815 | | 6/2006 |
| WO | WO2006138122 | A2 | 12/2006 |
| WO | 2007038896 | A2 | 4/2007 |
| WO | 2007082281 | | 7/2007 |
| WO | WO2007082247 | | 7/2007 |
| WO | WO2008014336 | A2 | 1/2008 |
| WO | 2008020162 | A2 | 2/2008 |
| WO | 2008072346 | A1 | 6/2008 |

OTHER PUBLICATIONS

Brent Waters, Ari Juels, J. Alex Halderman, and Edward W. Felten: "New Client Puzzle Outsourcing Techniques for DoS Resistance" CCS'04, Oct. 29, 2004, pp. 1-11, XP002538930 Washington, DC, USA abstract paragraph [01.2].
Written Opinion—PCT/US07/060357, International Search Authority, European Patent Office, Jun. 12, 2007.
European Search Report—EP10187769 ,Search Authority—Munich Patent Office, Dec. 2, 2010.
Taiwanese Search report—096101180—TIPO—Sep. 3, 2010.
European Search Report—EP10176878—Search Authority—Munich—Apr. 11, 2011.
European Search Report—EP10178266—Search Authority—Munich—Apr. 5, 2011.
European Search Report—EP10189181, Search Authority—Munich Patent Office, Mar. 9, 2011.
European Search Report—EP10189182—Search Authority—Munich—Mar. 10, 2011.
European Search Report—EP10191747—Search Authority—Munich—Mar. 18, 2011.
European Search Report—EP11150402—Search Authority—Munich—Mar. 14, 2011.
European Search Report—EP11157024—Search Authority—Munich—May 23, 2011.
European Search Report—EP11150397—Search Authority—Munich—Mar. 15, 2011.
IEEE Computer Society, Part 15. 4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.
IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.
IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. 3—2003, pp. 8 to 16, 108 to 111,116 to 117, 170 to 171,and 204 to206.
International Search Report and Written Opinion—PCT/US2009/058649, ISA/EPO—May 17, 2011.
Taiwan Search Report—096101138—TIPO—Jan. 4, 2011.
Taiwan Search Report—TW096101103—TIPO—Jan. 28, 2011.
Taiwan Search Report—TW096101104—TIPO—Jan. 27, 2011.
Taiwan Search Report—TW096101113—TIPO—May 23, 2011.
Taiwan Search Report—TW096101114—TIPO—Mar. 28, 2011.
Taiwan Search Report—TW096101119—TIPO—Mar. 10, 2011.
Taiwan Search Report—TW096101120—TIPO—Apr. 25, 2011.
Taiwan Search Report—TW096101125—TIPO—Nov. 5, 2010.
Taiwan Search Report—TW096101130—TIPO—Jan. 14, 2011.
Taiwan Search Report—TW096101132—TIPO—Jan. 31, 2011.
Translation of Office Action in Japan application 2008-550500 corresponding to U.S. Appl. No. 11/621,984, citing NIELS_HOVEN_et_al_pgs_250_255_year_2005, JP2005354326, JP2005151525, JP2001069060, JP2002232337 and JP2005537762 dated Mar. 29, 2011.
Translation of Office Action in Japan application 2008-550506 corresponding to U.S. Appl. No. 11/621,966, citing JP9107583, JP10013324, JP2003249939 and JP11355291 dated Mar. 29, 2011.
Translation of Office Action in Japan application 2008-550523 corresponding to U.S. Appl. No. 11/621,990, citing JP2004349777, JP2004336351, JP2005065101, JP2004260748, JP2004242187 and JP20042542542 dated Mar. 29, 2011.
Translation of Office Action in Korean Application 2008-7019606 corresponding to U.S. Appl. No. 11/621,967, citing GB2375014 and US20050025092 dated Feb. 23, 2011.
Wada, Y. et al., "Consideration of OFDM Cellular System Using Single Band", IEICE Year 2002 Communication Society Convention Lecture Papers 1, Aug. 20, 2002, p. 355, B-5-58.
International Search Report—PCT/US2007/060357, International Search Authority—European Patent Office—Jun. 12, 2007.
Written Opinion—PCT/US2007/060357, International Search Authority—European Patent Office—Jun. 12, 2007.
International Preliminary Report on Patentability—PCT/US2007/060357, International Search Authority—The International Bureau of WIPO—Geneva, Switzerland—Jul. 15, 2008.
Yanchao Zhang, Wei Liu, Wenjing Lou, Yuguang Fang; Anonymous Handshakes in Mobile Ad Hoc Networks; MILCOM 2004—2004 IEEE Military Communications Conference; pp. 1193-1199; XP-002432989.
Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.
Niels Hoven, Anant Sahai; Power Scaling for Cognitive Radio; 2005 International Conference on Wireless Networks, Communications and Mobile Computing; pp. 250-255.
Jose Costa-Requena, Raimo Kantola, Nicklas Beijar; Incentive.
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337 : XP-10855130A.
Cabric D et al: "Implementation Issues in Spectrum Sensing for Cognitive Radios" Signals, Systems and Computers, 2004. Conference Record of the Thirty-Eighth ASILOMAR Conference on Pacific Grove, CA Nov. 7-10, 2004 pp. 772-776 XP-010781056.
Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.
Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.
Dagres et al., "Flexible Radio: A General Framework with PHY-Layer Algorithm-Design Insights" EUROCON 2005, Nov. 22-24, 2005 pp. 120-123, XP-10916036.
Van De Beek, "ML Estimation of Time and Frequency Offset in OFDM Systems" IEEE Transactions on Signal Processing, vol. 45 No. 7 Jul. 1997, XP-11057861.
Brandes S et al: "Reduction of Out-Of-Band Radiation in OFDM Based Overlay Systems" New Frontiers in Dynamic Spectrum Access Networks, 2005. DYSPAN 2005. 2005 First IEEE International Symposium on Baltimore, MD, USA Nov. 8-11, 2005, Piscataway, NJ, USA,IEEE, pp. 662-665, XP010855171 ISBN: 1-4244-0013-9.

(56) References Cited

OTHER PUBLICATIONS

Hlavacs H., et al., "Enhancing ZRTP by using Computational Puzzles", Journal of Universal Computer Science, vol. 14 No. 5, Feb. 28, 2008, pp. 693-716.

Kim S., et al., "Reliable transfer on wireless sensor networks", 2004. IEEE SECON 2004—IEEE, pp. 449-459.

Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.

* cited by examiner

ENCODING BEACON SIGNALS TO PROVIDE IDENTIFICATION IN PEER-TO-PEER COMMUNICATION

CROSS-REFERENCE TO RELATED APPLICATIONS

This application claims the benefit of U.S. Provisional Patent application Ser. No. 60/758,010 entitled "METHODS AND APPARATUS FOR FACILITATING IDENTIFICATION, SYNCHRONIZATION OR ACQUISITION USING BEACON SIGNALS" which was filed Jan. 11, 2006; U.S. Provisional Patent application Ser. No. 60/758,011 entitled "METHODS AND APPARATUS FOR USING BEACON SIGNALS FOR IDENTIFICATION, SYNCHRONIZATION OR ACQUISITION IN AN AD HOC WIRELESS NETWORK" which was filed Jan. 11, 2006; U.S. Provisional Patent application Ser. No. 60/758,012 entitled "METHODS AND APPARATUS FOR USING BEACON SIGNALS IN A COGNITIVE RADIO NETWORK" which was filed Jan. 11, 2006;, U.S. Provisional Patent application Ser. No. 60/845,052 entitled "POWER ALLOCATION SCHEME" which was filed Sep. 15, 2006; U.S. Provisional Patent application Ser. No. 60/845,051 entitled "BEACONS IN A MIXED WIRELESS COMMUNICATION SYSTEM" which was filed Sep. 15, 2006; and U.S. Provisional Patent application Ser. No. 60/863,304 entitled "BEACONS IN A MIXED COMMUNICATION SYSTEM" which was filed Oct. 27, 2006. The entireties of the aforementioned applications are herein incorporated by reference.

BACKGROUND

I. Field

The following description relates generally to wireless communications, and more particularly to identifying peers based on encoded signals in a peer-to-peer network.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus, a significant subset of spectrum may be unused in a given geographic location or in a given time interval.

According to another example, wireless communication systems oftentimes employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range, power may be inefficiently utilized, and so forth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating encoding and/or decoding of signals utilized to identify a wireless terminal during peer discovery interval(s). Substantially any type of function that constrains encoding and/or decoding within a peer-to-peer network may be utilized. For example, a reversible function may be employed that enables a receiving peer to discern an identifier of a transmitting peer over a series of peer discovery intervals. Pursuant to another example, an irreversible function may be utilized whereby a receiving peer may be unable to decipher the identifier of the transmitting peer from a received signal; however, expected signal formats of buddy peers may be compared to the received signal to determine a presence of one of the buddy peers in a vicinity.

According to related aspects, a method that facilitates identifying a wireless terminal in a peer-to-peer network is described herein. The method may include receiving a first signal in a first peer discovery interval of a series of peer discovery intervals, wherein the first signal is generated by a disparate wireless terminal using a predetermined hash function. Further, the method may comprise generating an expected signal using at least one known identifier from a stored list of known identifiers based on the predetermined hash function. Moreover, the method may include comparing the received first signal with the generated expected signal to determine a presence of the disparate wireless terminal in a vicinity, wherein the disparate wireless terminal corresponds to the known identifier used to generate the expected signal.

Another aspect relates to a wireless communications apparatus. The wireless communications apparatus may include a memory that retains a list of known identifiers and instructions related to obtaining a first signal in a peer discovery interval, wherein the first signal is generated by a disparate wireless terminal using a predetermined hash function, generating an expected signal utilizing the known identifiers and the predetermined hash function, and comparing the obtained first signal with the generated expected signal to determine a presence of a peer in a vicinity, wherein the peer corresponds to the known identifier used to generate the expected signal. Further, the wireless communications apparatus may include a processor, coupled to the memory, configured to execute the instructions retained in the memory.

Yet another aspect relates to a wireless communications apparatus that enables utilizing an irreversible function in connection with encoding and/or decoding peer discovery signals in a peer-to-peer network. The wireless communications apparatus may include means for receiving a signal in a peer discovery interval, the signal being generated by a peer using a predetermined hash function; means for generating an expected signal utilizing at least one known identifier from a stored list based upon the predetermined hash function; and means for comparing the received signal with the generated signal to determine a presence of the peer in a vicinity.

Still another aspect relates to a machine-readable medium having stored thereon machine-executable instructions for obtaining a signal generated by a disparate wireless terminal using a predetermined hash function, generating an expected signal utilizing a known identifier from a list of known identifiers and the predetermined hash function, and comparing the obtained signal with the generated expected signal to determine a presence of a peer in a vicinity, wherein the peer corresponds to the known identifier used to generate the expected signal.

In accordance with another aspect, an apparatus in a wireless communication system may include a processor, wherein the processor may be configured to detect a signal in a peer discovery interval, wherein the signal is generated by a disparate wireless terminal using a predetermined hash function. Further, the processor may be configured to generate an expected signal using at least one known identifier from a stored list of known identifiers based on the predetermined hash function. Moreover, the processor may be configured to compare the received signal with the generated expected signal to determine a presence of a peer in a vicinity, wherein the peer corresponds to the known identifier used to generate the expected signal.

To the accomplishment of the foregoing and related ends, the one or more embodiments comprise the features hereinafter fully described and particularly pointed out in the claims. The following description ad the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
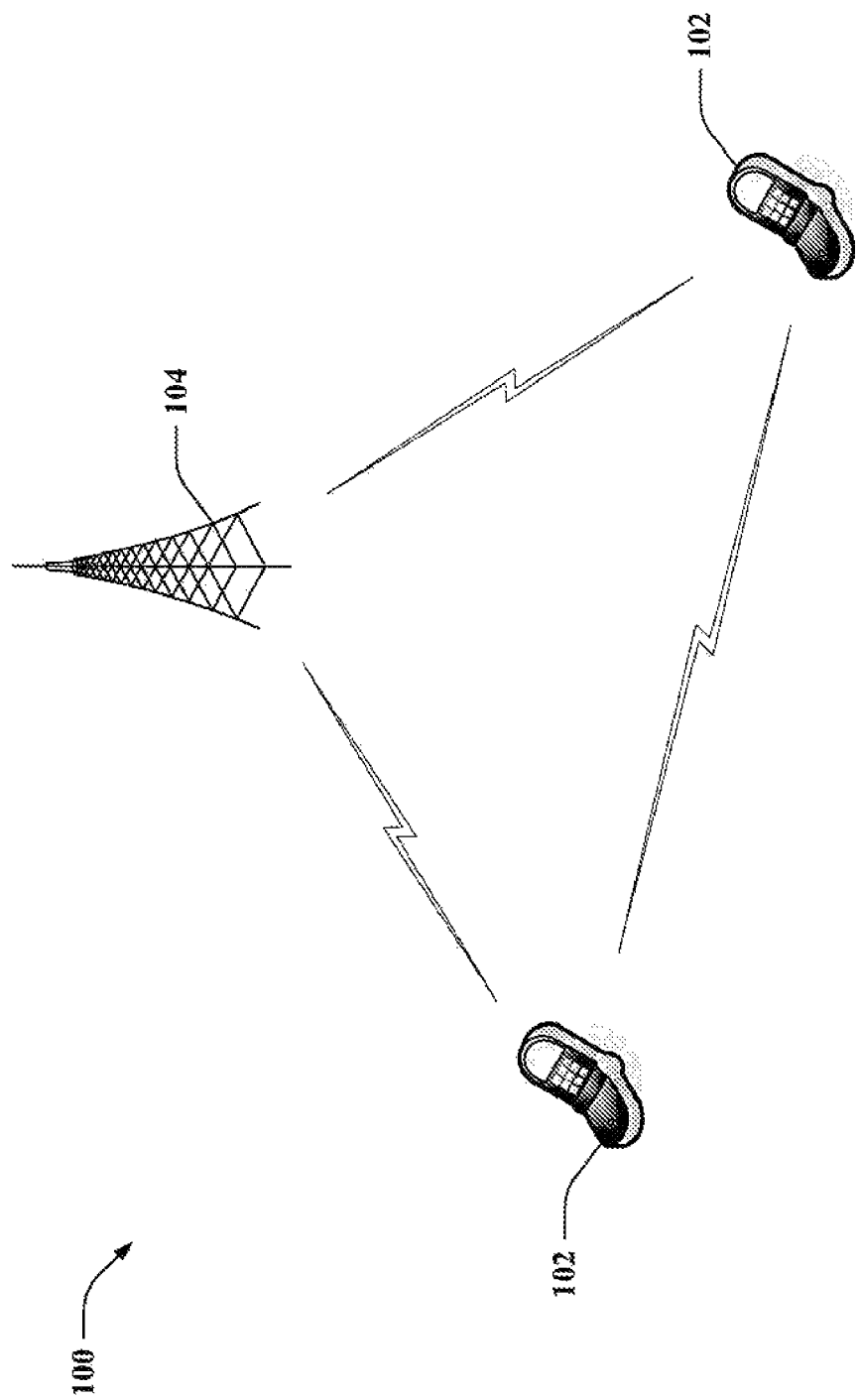
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more wireless terminals 102. Although two wireless terminals 102 are depicted, it is to be appreciated that system 100 may include substantially any number of wireless terminals 102. Wireless terminals 102 can be, for example, cellular phones, smart phones, laptops, handheld communication devices, handheld computing devices, satellite, radios, global positioning systems, PDAs, and/or any other suitable device for communicating over wireless communication system 100. Wireless terminals 102 can communicate directly with each other via a local area peer-to-peer (P2P) network (e.g., ad hoc network). Peer-to-peer communication may be effectuated by directly transferring signals between wireless terminals 102; thus, the signals need not traverse through a base station (e.g., base station 104). The peer-to-peer network may provide short range, high data rate communication (e.g., within a home, office, etc. type setting).

Further, system 100 may support a wide area network (WAN). System 100 may include a base station 104 (e.g., access point) and/or any number of disparate base stations (not shown) in one or more sectors that receive, transmit, repeat, etc. wireless communication signals to each other and/or to one or more wireless terminals 102. Base station 104 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Wireless terminal(s) 102 may transmit signals to and/or receive signals from base station 104 when communicating via the wide area infra-structure network supported by system 100.

Peer-to-peer communication between wireless terminals 102 may be synchronous. For example, wireless terminals 102 may utilize a common clock reference to synchronize performance of distinct functions. Wireless terminals 102 may obtain timing signals from base station 104 (and/or a transmitter (not shown) that provides less functionality) utilized to synchronize operation of wireless terminals 102. Wireless terminal 102 may obtain timing signals from other sources, for instance, GPS satellites. According to an illustration, time may be meaningfully partitioned in a peer-to-peer network for functions such as peer discovery, paging, and traffic. Further, it is contemplated that each peer-to-peer network may set its own time.

Before communication of traffic in a peer-to-peer network can take place, wireless terminals 102 (e.g., peers) may detect and identify each other. The process by which this mutual detection and identification between peers takes place may be referred to as peer discovery. System 100 may support peer discovery by providing that peers desiring to establish peer-to-peer communication periodically transmit short messages and listen to the transmissions of others. For example, each one of the wireless terminals 102 (e.g., sending wireless terminal) may periodically send signals to the other wireless terminal(s) 102 (e.g., receiving wireless terminal(s)) in the peer-to-peer network so that the receiving wireless terminal(s) may identify the sending wireless terminal when the receiving wireless terminal(s) are in vicinity of the sending wireless terminal. After identification, an active connection may be established.

Transmissions for peer discovery may periodically occur during specified times referred to as peer discovery intervals, the timing of which may be predetermined by a protocol and known to wireless terminals 102. Wireless terminals 102 may each transmit respective signals to identify themselves. For example, each wireless terminal 102 may send a signal during a portion of a peer discovery interval. Further, each wireless terminal 102 may monitor signals potentially transmitted by other wireless terminals 102 in a remainder of the peer discovery interval. According to an example, the signal may be a beacon signal. By way of another illustration, the peer discovery interval may include a number of symbols (e.g., OFDM symbols). Each wireless terminal 102 may select at least one symbol in the peer discovery interval for transmission by that wireless terminal 102. Moreover, each wireless terminal 102 may transmit a corresponding signal in one tone in the symbol selected by that wireless terminal 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

Figure 2:
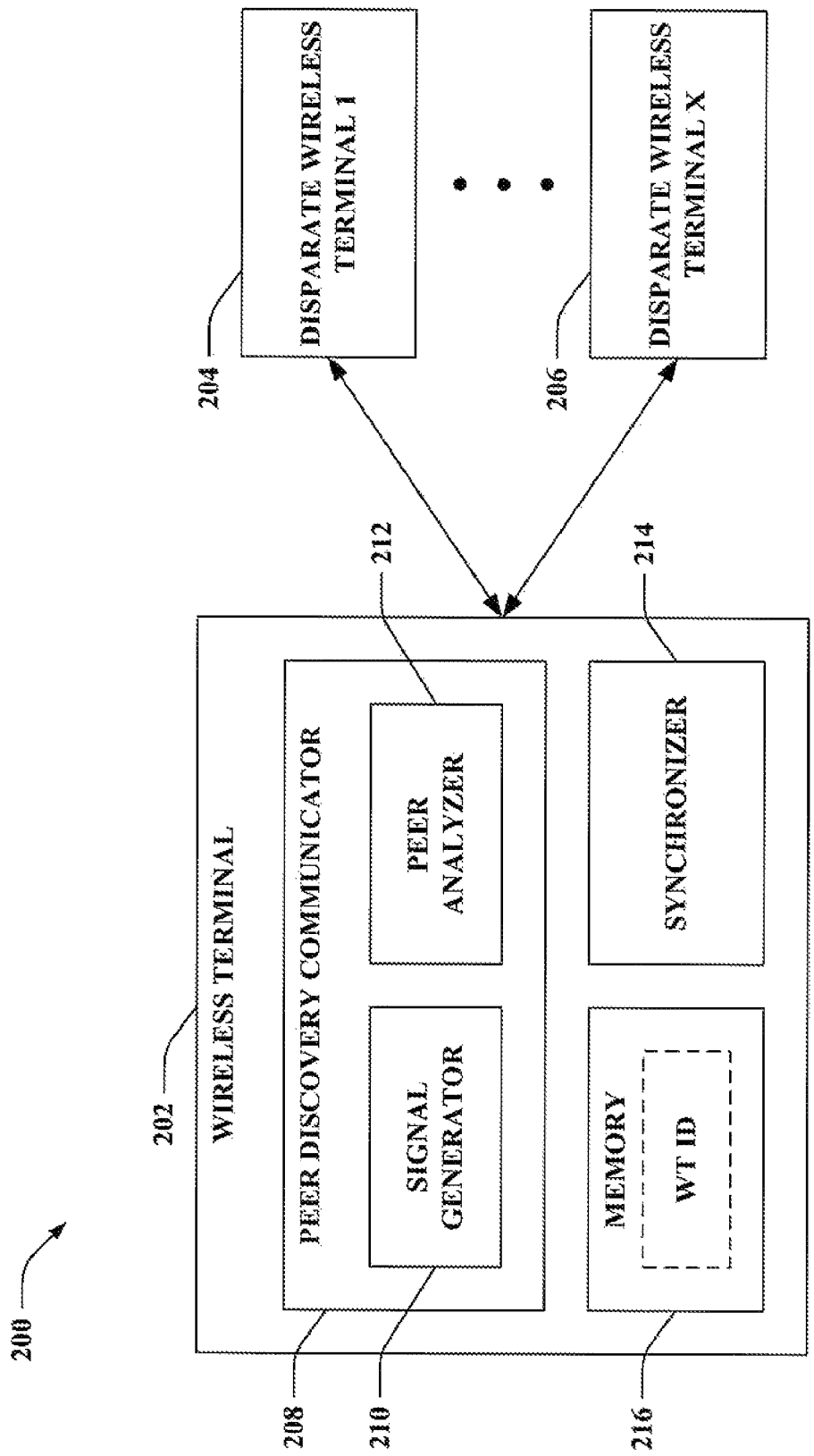
FIG. 2 is an illustration of an example system that enables mutual identification of peers in a peer-to-peer network.

Now turning to FIG. 2, illustrated is a system 200 that enables mutual identification of peers in a peer-to-peer network. System 200 includes a wireless terminal 202 that communicates directly with substantially any number of disparate wireless terminals (e.g., disparate wireless terminal 1 204, . . . , disparate wireless terminal X 206, where X may be any integer). Although the following provides further detail with regards to wireless terminal 202, it is to be appreciated that such illustrations may similarly apply to disparate wireless terminals 204-206.

Wireless terminal 202 may further include a peer discovery communicator 208 that effectuates encoding, sending, receiving, evaluating, etc. signals associated with peer discovery during a peer discovery interval (or a plurality of peer discovery intervals). Peer discovery communicator 208 may further comprise a signal generator 210 and a peer analyzer 212. Signal generator 210 may generate and/or transmit a signal to disparate wireless terminals 204-206, and disparate wireless terminals 204-206 may evaluate the signal to detect and identify wireless terminal 202. Further, peer analyzer 212 may receive signal(s) sent from disparate wireless terminal(s) 204-206; peer analyzer 212 may evaluate the received signal(s) to detect and identify disparate wireless terminal(s) 204-206 to which the received signal(s) correspond.

Wireless terminal 202 may additionally include a synchronizer 214 that conforms timing between wireless terminal 202 and disparate wireless terminals 204-206. Synchronizer 214 may obtain its timing from broadcast information (e.g., a common clock reference) from a base station (not shown) in a vicinity of wireless terminal 202 and disparate wireless terminals 204-206. Similar synchronizers (not shown) of disparate wireless terminals 204-206 may obtain their respective timing from the same broadcast information. The broadcast information may additionally or alternatively include GPS satellite signals. The broadcast information may be periodically received by synchronizer 214. Moreover, the broadcast information may be, for example, a single-tone beacon signal, a CDMA PN (pseudo random) sequence signal, a pilot signal or other broadcast signal. Synchronizer 214 may evaluate the obtained broadcast information to determine timing information. By way of illustration, wireless terminal 202 and disparate wireless terminals 204-206 may receive and synchronize to the same broadcast information, and therefore, have a common understanding of time. The common notion of time may be utilized to partition a timeline into distinct intervals for differing types of functions such as, for instance, peer discovery, paging, and traffic, according to a predetermined pattern defined by an air interface protocol. Moreover, the timing information may be utilized by signal generator 210 to create signals for transmission during peer discovery and/or peer analyzer 212 to evaluate received signals for peer discovery.

Each wireless terminal (e.g., wireless terminal 202, disparate wireless terminals 204-206) may be associated with a respective, unique identifier (WT ID). For example, wireless terminal 202 may include memory 216 that retains a unique identifier (WT ID) that corresponds to wireless terminal 202. However, it is contemplated that wireless terminal 202 may derive, obtain, etc. its unique identifier (WT ID), from any location (e.g., local and/or remote to wireless terminal 202). Additionally, memory 216 may retain any additional type of data and/or instructions related to wireless terminal 202. Moreover, wireless terminal 202 may include a processor (not shown) that executes instructions described herein.

Signal generator 210 may create and/or transmit a signal to disparate wireless terminals 204-206. Signal generator 210 may encode and/or send a signal in a peer discovery interval as a function of the unique identifier of wireless terminal 202 (WT ID). In accordance with an example, the signal yielded by signal generator 210 may be a single-tone beacon signal, which may provide power efficiency; thus, signal generator 210 may effectuate transmitting a particular tone on a selected OFDM symbol within a peer discovery interval. It is contemplated that more than one beacon signal may be transmitted (e.g., in a plurality of OFDM symbols). For example, where the transmitted signal is a beacon signal, a selected symbol time position (e.g., within the peer discovery interval) and/or a tone position may be derived by a hash function of the unique identifier of wireless terminal 202 (WT ID) and a time variable (e.g., timing information obtained by synchronizer 214, time counter) identifying a current peer discovery interval. Further, wireless terminal 202 and disparate wireless terminals 204-206 may have a common value of the time variable (e.g., due to synchronization achieved by listening to an infrastructure communication channel available in a geographic area).

Pursuant to another example, the identifier associated with wireless terminal 202 (WT ID) may be broadcast to peer(s) by signal generator 210 (and/or peer discovery communicator 208). Peer(s) obtaining the signal may detect and/or identify wireless terminal 202. For example, the signal yielded by signal generator 210 may be an output of an M-bit hash function whose input is the plain-text name of wireless terminal 202 (e.g., WT ID) and a current counter value supplied by a base station broadcast signal (e.g., common clock reference). The counter value, for instance, may be constant during a current peer discovery interval and may be decodable by all peers. The counter value may vary (e.g., increment in a modulo sense) from one peer discovery interval to another. Further, the hash function may be specified a priori by a protocol and known to the peers.

By way of example, wireless terminal 202 may be located in a peer-to-peer network that includes disparate wireless terminal 1 204 and disparate wireless terminal X 206. Synchronizer 214 may determine timing associated with peer-to-peer communications (e.g., based upon a received common clock reference). Further, at a time partitioned for peer discovery, signal generator 210 may broadcast a signal (e.g., generated based upon an ID of the originating wireless terminal 202 and/or a current time) to disparate wireless terminals within range (e.g., disparate wireless terminals 204-206). The signal may be received and utilized by disparate wireless terminals 204-206 to detect wireless terminal 202 and/or determine an identity of wireless terminal 202. Moreover, peer analyzer 212 may obtain broadcast signals from disparate wireless terminals 204-206. Peer analyzer 212 may evaluate the obtained signals to detect disparate wireless terminals 204-206 and/or identify disparate wireless terminals 204-206.

Peer discovery effectuated by peer discovery communicator 208 may be passive. Further, peer discovery may be symmetric; thus, wireless terminal 202 may detect and identify disparate wireless terminal 1 204 and disparate wireless terminal 1 204 may detect and identify wireless terminal 202. However, it is contemplated that a first wireless terminal may detect and identify a second wireless terminal, but the second wireless terminal may fail to detect and identify the first wireless terminal. Additionally, upon detection and identification, further communication (e.g., paging, traffic) between wireless terminal 202 and disparate wireless terminal(s) 204-206 may, but need not, be effectuated.

Peer analyzer 212 may maintains a list of disparate wireless terminals 204-206 that are detected to be present in the current time. The list may include all disparate wireless terminals 204-206 or may include those in a predefined buddy list of wireless terminal 202 or the user who is using wireless terminal 202. As the time goes by, the list evolves, because some disparate wireless terminals 204-206 may disappear (e.g., because the corresponding users move away), or because other disparate wireless terminals 204-206 may appear (e.g., because the corresponding users move close). Peer analyzer 212 may add the new disparate wireless terminals 204-206 to the list or delete disappearing disparate wireless terminals 204-206 from the list. In one embodiment, peer analyzer 212 passively maintains the list. In this case, a first peer may detect the presence of a second peer and keep the second peer in its list without informing the second peer. As a result, the second peer may not know that the first peer has already kept the second peer in the list. By symmetry, depending on wireless channel and interference condition, the second peer may also detect the presence of the first peer and keep the first peer in its list without informing the first peer. In another embodiment, after the first peer detects the presence of the second peer, the first peer proactively sends a signal to inform the second peer so that the second peer now knows that the first peer has already kept the second peer in the list, even though the first peer has no data traffic to communicate with the second peer yet. The first peer may selectively decide whether it sends a signal. For example, the first peer may send a signal only to another peer that is in the predefined buddy list.

Figure 3:
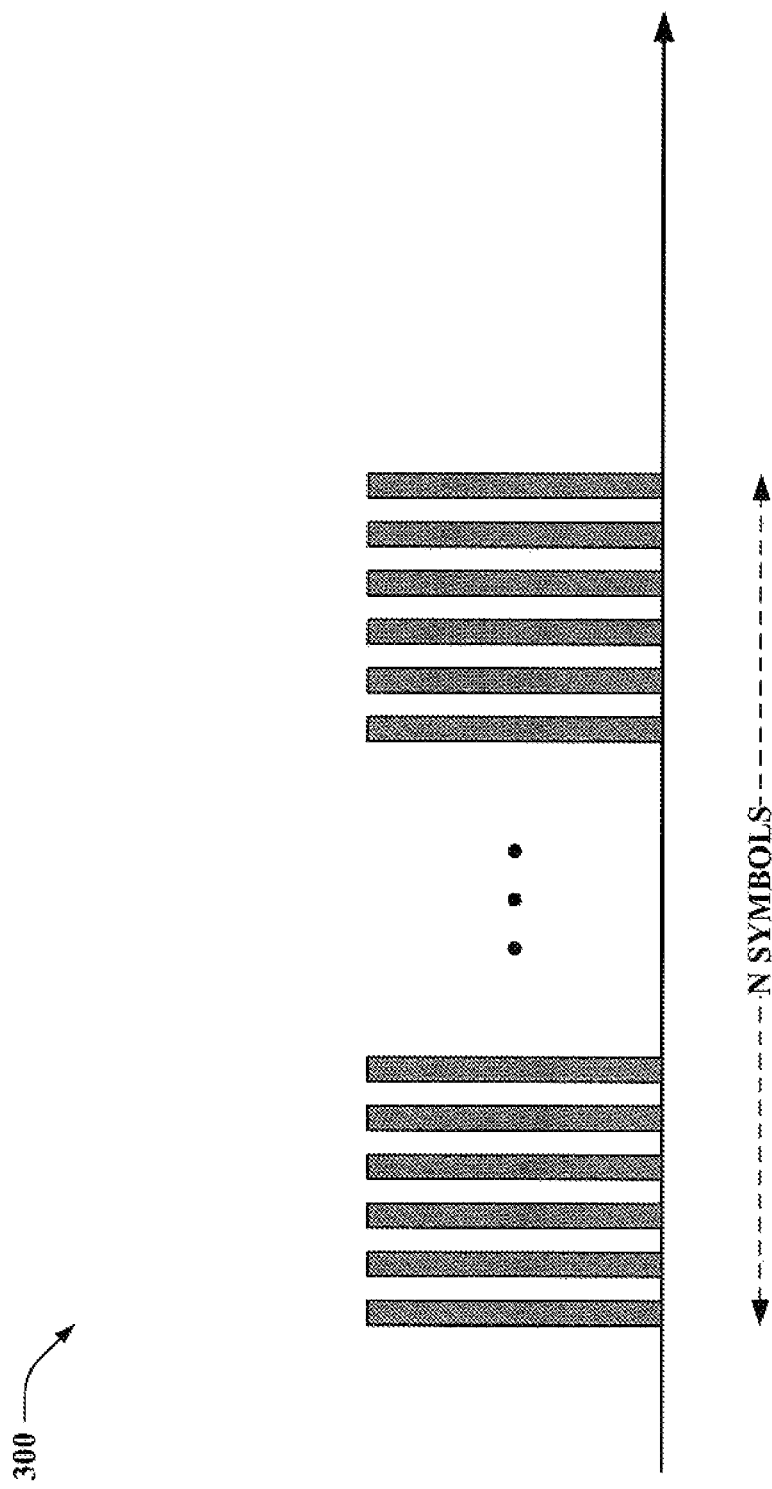
FIG. 3 is an illustration of an example timing diagram of a peer discovery interval.

Referring to FIG. 3, illustrated is an example timing diagram 300 of a peer discovery interval. The peer discovery interval may include a number of possible transmission times during which a wireless terminal can broadcast a signal. For instance, the peer discovery interval may include N symbols (e.g., OFDM symbols), where N may be any integer. Further, each symbol may last 10 μs and N may be 50, 100, 200, etc.; however, the subject claims are not so limited. Each peer within a peer-to-peer network may transmit utilizing one or more of the symbols; the peer may listen to the remainder of the symbols to detect and/or identify other peers within range. In accordance with an example where beacon signals are transmitted, a peer may transmit a first tone on a first symbol (e.g., at a first time within the peer discovery interval) and a second tone on a second symbol (e.g., at a second time within the peer discovery interval), where the first symbol and the second symbol may or may not be contiguous.

According to an example, the peer discovery interval may include 200 symbols. In an embodiment, all 200 symbols may be used for transmitting broadcast signals by the wireless terminals. In another embodiment, every other symbol may be utilized for transmission (e.g., 100 symbols may be employed for transmission). Before the peer discovery interval, each wireless terminal that wishes to engage in peer-to-peer communication may select one or more symbols for transmission. During the selected symbol time(s), the wireless terminal transmits a message (e.g., tone) to disparate wireless terminal(s) (e.g., peer(s)). The message may include one tone in one of the selected transmission symbols. Further, during at least a fraction of the remaining symbol times in the peer discovery interval, the wireless terminal listens and decodes the transmissions of the disparate wireless terminal(s). Since peer-to-peer communication may employ a half-duplex mode, where a wireless terminal either transmits or receives data at a particular time but cannot transmit and receive simultaneously, the wireless terminal may transmit for 10% of the transmission times and receive for the remaining 90% of the time. By way of another example, the wireless terminal may transmit 30% of the time and receive 70% of the time. In accordance with an illustration, the wireless terminal may determine the transmission time(s) and/or the waveform (e.g., the frequency tone transmitted in a selected transmission symbol) to transmit based upon an identifier and/or a notion of time (e.g., derived from a received Beacon). The notion of time is in essence a time-varying variable. All the wireless terminals may get the same notion of time. For example, the wireless terminals may obtain a time-varying variable from the broadcast (e.g., beacon) signal from the base station. The time-varying variable can be some variable transmitted in the broadcast signal. For example, the variable can be some time counter or system time, which varies over time. In this document, the notion of time is referred to as time counter. It is desired that the time counter varies from one peer discovery interval to another. By way of further example, the wireless terminal may utilize a pseudo-random number generator, whose seed can be an identifier of the wireless terminal and a current counter value supplied by a broadcast signal from a base station, to select transmission time(s) and/or the waveform. As the time counter varies, the selected transmission symbol time(s) and/or waveform may also vary from one peer discovery interval to another.

Figure 4:
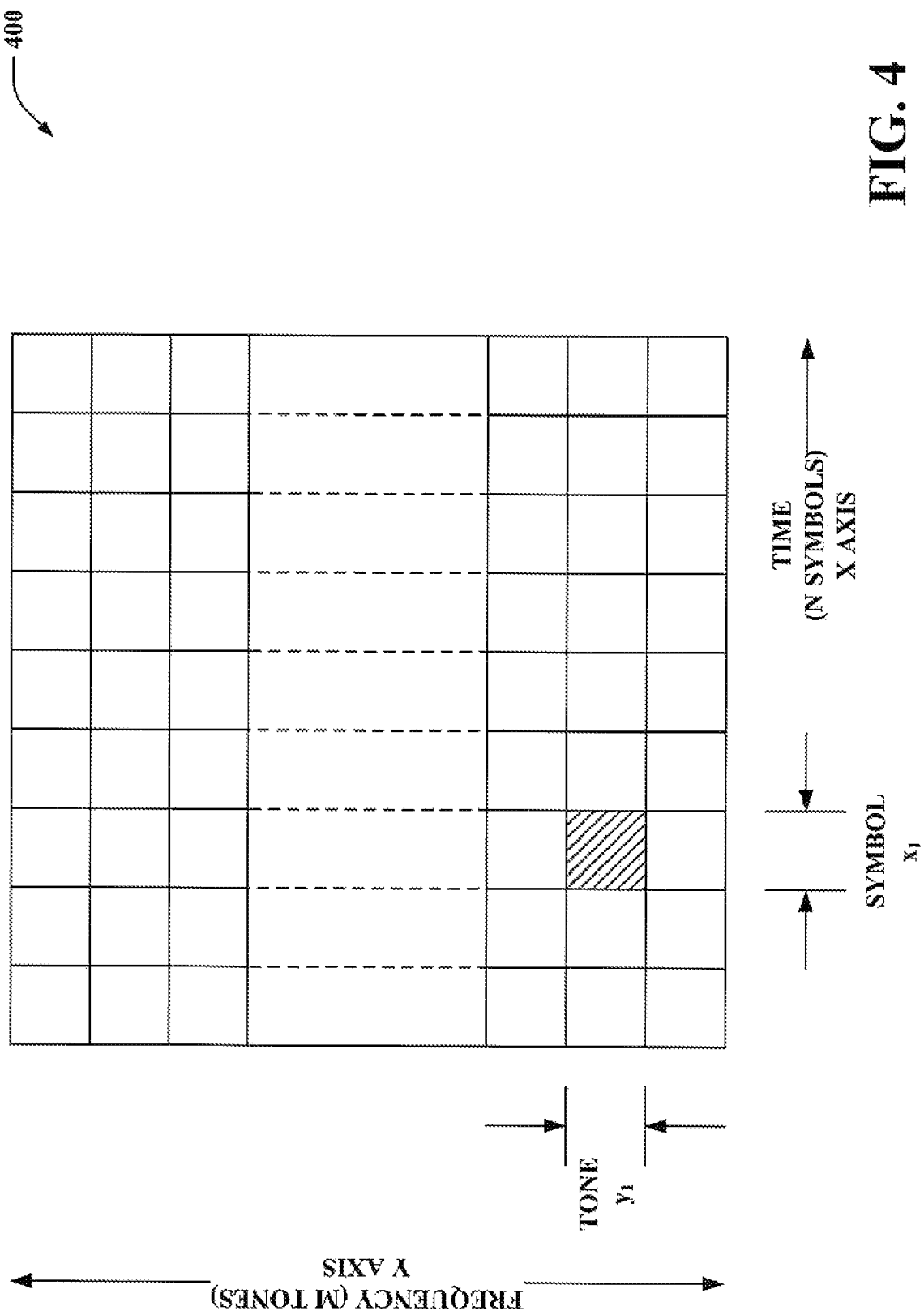
FIG. 4 is an illustration of an example time-frequency grid associated with transmission during a peer discovery interval.

Now turning to FIG. 4, illustrated is an example time-frequency grid 400 associated with transmission during a peer discovery interval. The time frequency grid 400 is the resource available for transmitting and/or receiving signals over a peer-to-peer network during a peer discovery interval. The x-axis represents time and may include N symbols (e.g., where N may be any integer), and the y-axis represents frequency and may include M tones (e.g., where M may be any integer). For example, the time-frequency grid 400 for a peer discovery interval may include 200 symbols and 50 tones (e.g., resource of 1000); however, the claimed subject matter contemplates utilizing any size time-frequency resource.

According to an example, a wireless terminal may select a particular symbol (e.g., transmission time) for transmission based upon an identifier of the wireless terminal or a user who is utilizing the wireless terminal and/or a time variable (e.g., time counter) that may be commonly understood within a peer-to-peer network to identify a current peer discovery interval. Further, a particular tone corresponding to the selected symbol may be determined (e.g., based upon the identifier and/or time variable). Pursuant to a further example, a hash function of the identifier and the time variable may yield the selected symbol position and/or tone position. Moreover, the x and y coordinates (e.g., $(x_1, y_1)$) within grid 400, as illustrated by the shading, may provide information (e.g., when evaluated by a peer receiving such signal). However, the size of the identifier may be larger than a size of data that may be communicated via a transmitted signal (e.g., encoded with the symbol-tone position) when transmitting one symbol in one peer discovery interval. For instance, the identifier may be 32 bits or more, while a resource of 1000 may provide 10 bits of information when a wireless terminal transmits one tone on one symbol during a peer discovery interval.

By transmitting a single symbol, the alphabet employed by the wireless terminal may be $\log_2(M \cdot N)$. According to a further example, more than one symbol may be utilized by the wireless terminal for transmission during one or a plurality of (e.g., successive) peer discovery intervals. Pursuant to this example, the tones (e.g., Beacons) may be transmitted at different times. By way of illustration, if two Beacons are transmitted with coordinates $(x_1, y_1)$ and $(x_2, y_2)$ where $x_1$ and $x_2$ may be in the same peer discovery interval or two different intervals, $x_1$ differs from $x_2$ to mitigate transmitting the two Beacons concurrently. In accordance with a further example, signals transmitted during sequential peer discovery intervals may be linked together to enable identification by receiving wireless terminal(s).

Figure 5:
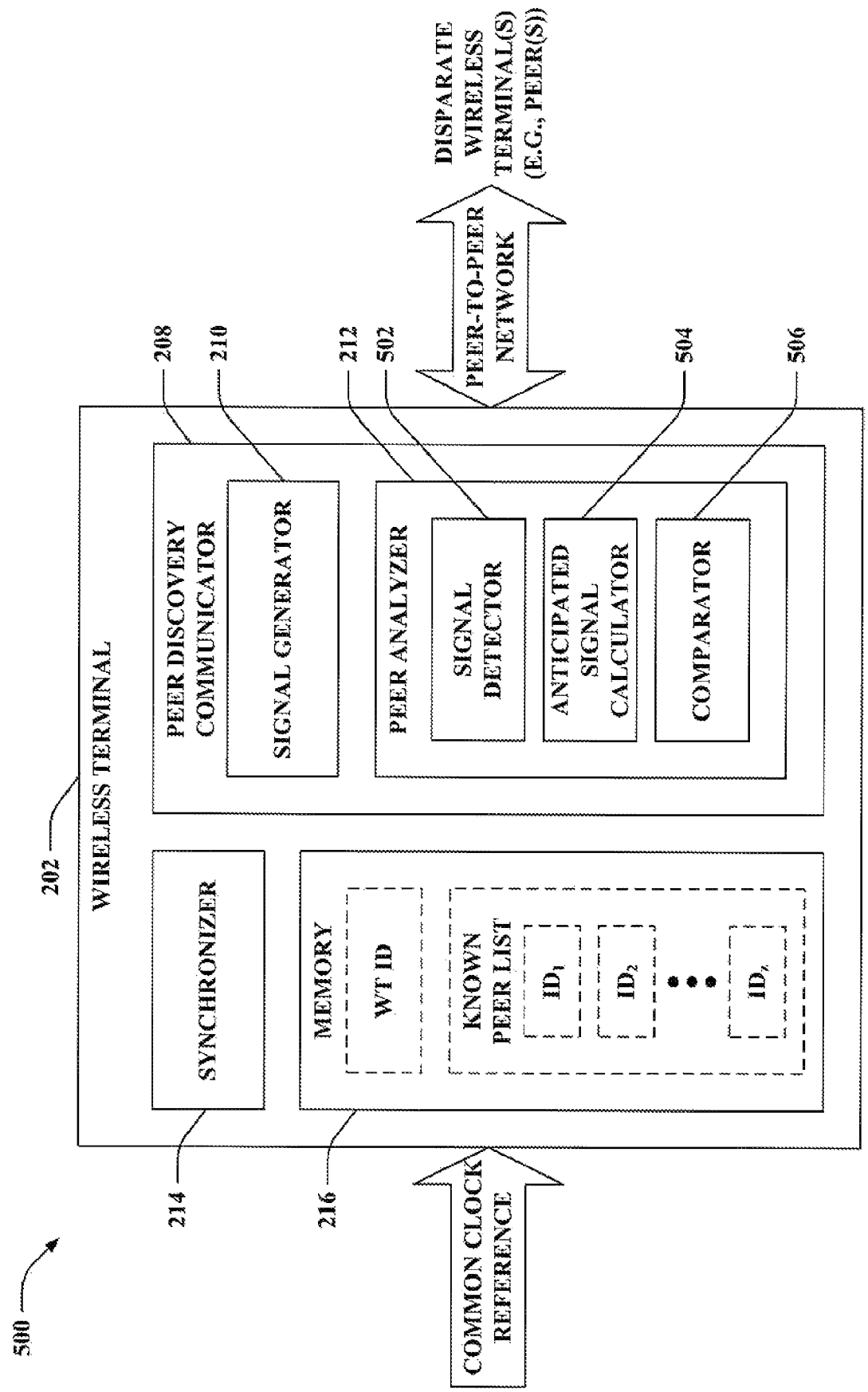
FIG. 5 is an illustration of an example system that utilizes a function for encoding peer discovery signals communicated and evaluated in a peer-to-peer network.

Referring now to FIG. 5, illustrated is a system 500 that utilizes a function for encoding peer discovery signals communicated and evaluated in a peer-to-peer network. The function may be irreversible; however, it is contemplated that a reversible function may be utilized in connection with system 500. System 500 includes wireless terminal 202 that may communicate via a peer-to-peer network with disparate wireless terminal(s) (e.g., peer(s)). Wireless terminal 202 may include peer discovery communicator 208 that enables sending and/or obtaining peer discovery signals during a peer discovery interval (e.g., by leveraging signal generator 210 and peer analyzer 212). Further, wireless terminal 202 may include synchronizer 214 that obtains and analyzes a common clock reference to coordinate performance of various functions (e.g., peer discovery, paging, traffic) and determine a meaningful notion of time (e.g., time counter) consistent with disparate wireless terminals in the peer-to-peer network. Therefore, peers get the same timing (timing synchronized) without directly communicating with each other.

Moreover, wireless terminal 202 may include memory 216. An identifier related to wireless terminal 202 (WT ID) may be stored in memory 216. Additionally, a known peer list (e.g., buddy peer list) may be maintained in memory. The known peer list may include identifiers (e.g., $ID_1, ID_2, \ldots, ID_z$, where z may be any integer) corresponding to buddy peers that may or may not be located within the peer-to-peer network (e.g., within range of wireless terminal 202) at a given time. For example, a subset, none or all of the disparate wireless terminals in the peer-to-peer network with wireless terminal 202 may be buddy peers of wireless terminal 202; thus, memory 216 of wireless terminal 202 may maintain ID's corresponding to such disparate wireless terminals that are buddy peers. By way of further example, an identifier may be lacking from the known peer list in memory 216 of wireless terminal 202 for any disparate wireless terminal(s) (e.g., in the peer-to-peer network with wireless terminal 202) that is not a buddy peer of wireless terminal 202.

Signal generator 210 (and/or similar signal generator(s) of disparate wireless terminal(s) in the peer-to-peer network) may employ an irreversible function (e.g., irreversible hash function) to yield a peer discovery signal. Since the function is irreversible, a receiving wireless terminal may be unable to decipher the identifier from an obtained peer discovery signal; rather, a known identifier may be subjected to the same irreversible function and the output may be compared with a received signal. By way of example, signal generator 210 may utilize an identifier of wireless terminal 202 (WT ID) (e.g., wireless terminal that generates the peer discovery signal) and a time variable (e.g., time counter) that relates to a current peer discovery interval (e.g., as determined by synchronizer 214) as input to the irreversible function to derive a symbol position and/or a tone position for the peer discovery signal. Likewise, similar signal generator(s) may employ respective identifiers that correspond to each disparate wireless terminal. Further, the encoded peer discovery signal may be broadcast over the peer-to-peer network. Thus, for example, broadcast peer discovery signal(s) yielded by signal generator(s) of the disparate wireless terminal(s) in the peer-to-peer network may be received by wireless terminal 202.

Peer analyzer 212 may further include a signal detector 502, an anticipated signal calculator 504, and/or a comparator 506. Signal detector 502 may receive signal(s) communicated over the peer-to-peer network during a peer discovery interval. For example, the received signal(s) may include peer discovery signal(s) sent by disparate wireless terminal(s) (e.g., buddy peers or non-buddy peers), interference, and so forth.

Moreover, anticipated signal calculator 504 may generate current expected signal formats for each buddy peer. In the case of using beacon signals, anticipated signal calculator 504 may determine a coordinate pair (e.g., associated with time-frequency grid 400 of FIG. 4) of an expected, selected symbol position (e.g., x coordinate) and a corresponding expected, selected tone position (e.g., y coordinate) for each buddy peer. For example, the irreversible function employed by signal generator 210 may similarly be utilized by anticipated signal calculator 504 to yield the expected coordinate pairs associated with each buddy peer. Additionally, anticipated signal calculator 504 may generate the expected coordinate pair for each buddy peer as a function of the time variable (e.g. time counter) and the respective identifier corresponding to the buddy peer. It is possible that a different function may be employed for a different buddy peer. For example, suppose that wireless terminal 202 has two buddy peers. It is known to wireless terminal 202 that the first buddy peer uses a first function to generate its signal and the second buddy peer uses a second function to generate its signal. The first and the second functions may be the same or may be different. As long as the first and the second functions are predetermined and known, wireless terminal 202 can derive the expected signals from the first and the second buddy peers.

Comparator 506 compares detected signal(s) (e.g., obtained with signal detector 502) with calculated, expected signal formats (e.g., determined by anticipated signal calculator 504) to yield a probability associated with buddy peer(s) being in a vicinity of wireless terminal 202 (e.g., buddy peer being one of the disparate wireless terminal(s) included in a shared peer-to-peer network). If a detected signal matches the expected signal format of one of the buddy peers, comparator 506 may record that there is a possibility the corresponding buddy peer may be in the vicinity (e.g., within the peer-to-peer network). If the expected signal format of the same buddy peer is observed by comparator 506 in several peer discovery intervals, then the probability of the buddy peer being in the vicinity may be high. Moreover, if an expected signal format does not match any detected signal, the buddy peer corresponding to the expected signal format may be located outside of the peer-to-peer network (e.g., out of range of wireless terminal 202). Further, if a detected signal does not match any expected signal format, this detected signal may not relate to a buddy peer; rather, the detected signal may pertain to a non-buddy peer, noise, and so forth.

According to another example, comparator 506 may consider an energy level associated with signal(s) obtained with detector 502. Pursuant to this example, comparator 506 may assign a high probability to a detected signal with a high energy level that matches an expected signal format of one of the buddy peers. Further, comparator 506 may allocate a low probability of one of the buddy peers being in the peer-to-peer network when a detected signal with a low energy level matches an expected signal format of that buddy peer.

By way of another example, a list of plain-text names of buddy peers associated with wireless terminal 202 may be maintained in memory 216 (e.g., known peer list). Further, upon decoding a particular ID with signal detector 502, anticipated signal calculator 504 may hash the plain-text buddy names from memory 216 using the current counter value. If at least one of the output IDs matches the decoded ID, comparator 506 may conclude that the corresponding buddy peer is present with a certain probability. If no match is found or there are multiple matches, comparator 506 may be unable to conclude as to the presence of any buddy peers. Moreover, each peer may vary a number of bits of an output of the ID generating hash function in order to ensure that it is eventually discovered.

Figure 6:
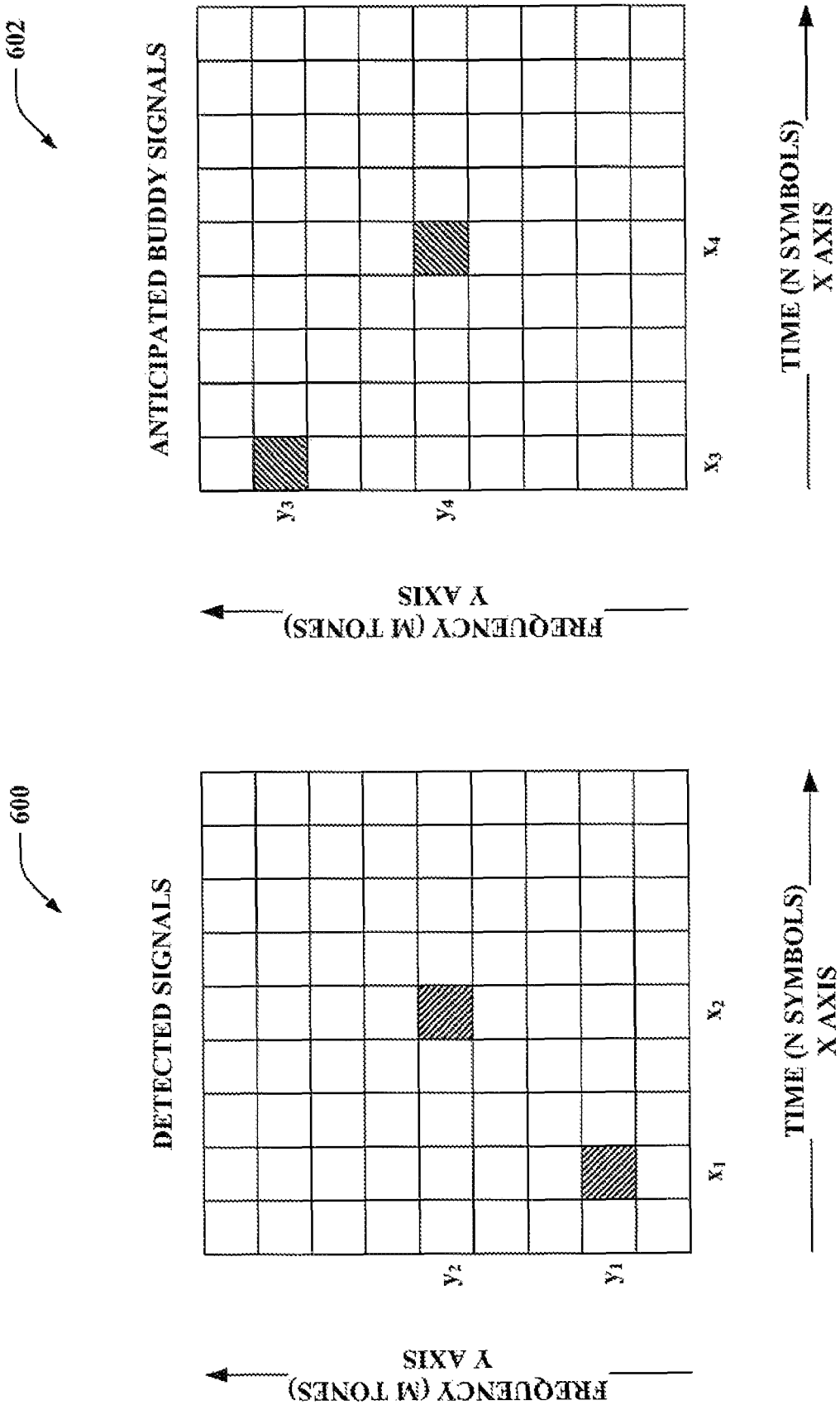
FIG. 6 is an illustration of an example graphical depiction of an evaluation of detected signals (e.g., beacon signals) effectuated by a peer analyzer of a wireless terminal in a peer-to-peer environment.

With reference to FIG. 6, illustrated is an example graphical depiction of an evaluation of detected signals (e.g., beacon signals) effectuated by a peer analyzer 212 of a wireless terminal 202 in a peer-to-peer environment. Pursuant to this example, peer discovery signals may be generated by employing an irreversible function. Thus, peer analyzer 212 may be unable to calculate ID(s) from detected signals, where the ID(s) correspond to the disparate wireless terminals that broadcast each signal.

An example detected signals time-frequency resource 600 and an example anticipated buddy signals time-frequency resource 602 are illustrated; these time-frequency resources 600-602 may be similar to time-frequency resource 400 of FIG. 4. It is to be appreciated, however, that the claimed subject matter is not limited to these examples. Detected signals time-frequency resource 600 illustrates two detected signals (e.g., obtained with signal detector 502) with symbol-tone coordinate pairs $(x_1, y_1)$ and $(x_2, y_2)$. Accordingly, tone $y_1$ is detected on symbol $x_1$ and tone $y_2$ is detected on symbol $x_2$ at wireless terminal 202. The receiver may determine that a tone is detected in a symbol if the received power on that tone is significantly (e.g., at least 5 dB) higher than the average per-tone received power.

Wireless terminal 202 may retain a buddy list in memory 216, and expected symbol-tone coordinate pairs may be calculated as a function of ID's included in the buddy list and a time counter. Anticipated buddy signals time-frequency resource 602 illustrates examples of expected symbol-tone coordinate pairs derived based on the buddy list ID's and the time counter. As shown, the expected symbol-tone coordinate pairs are $(x_3, y_3)$ and $(x_4, y_4)$.

Further, by comparing detected signals resource 600 with anticipated buddy signals resource 602, it may be determined that one of the detected signals at $(x_2, y_2)$ matches one of the anticipated signals at $(x_4, y_4)$. Thus, a high probability may be assigned to the buddy peer corresponding to the anticipated buddy signal at $(x_4, y_4)$ being in the vicinity of the wireless terminal that detected the signals. Further, if the buddy peer is detected in the next peer discovery interval as well, then even higher probability may be assigned to the buddy peer being in the vicinity. Moreover, since a match for the detected signal at $(x_1, y_1)$ is lacking, the wireless terminal may determine that such detected signal may have originated from a non-buddy peer or may be noise. Furthermore, since a match for the buddy peer associated with the anticipated buddy signal at $(x_3, y_3)$ is lacking, the wireless terminal may determine that this buddy peer may be positioned outside of the peer-to-peer network (e.g., out of range of the wireless terminal).

Figure 7:
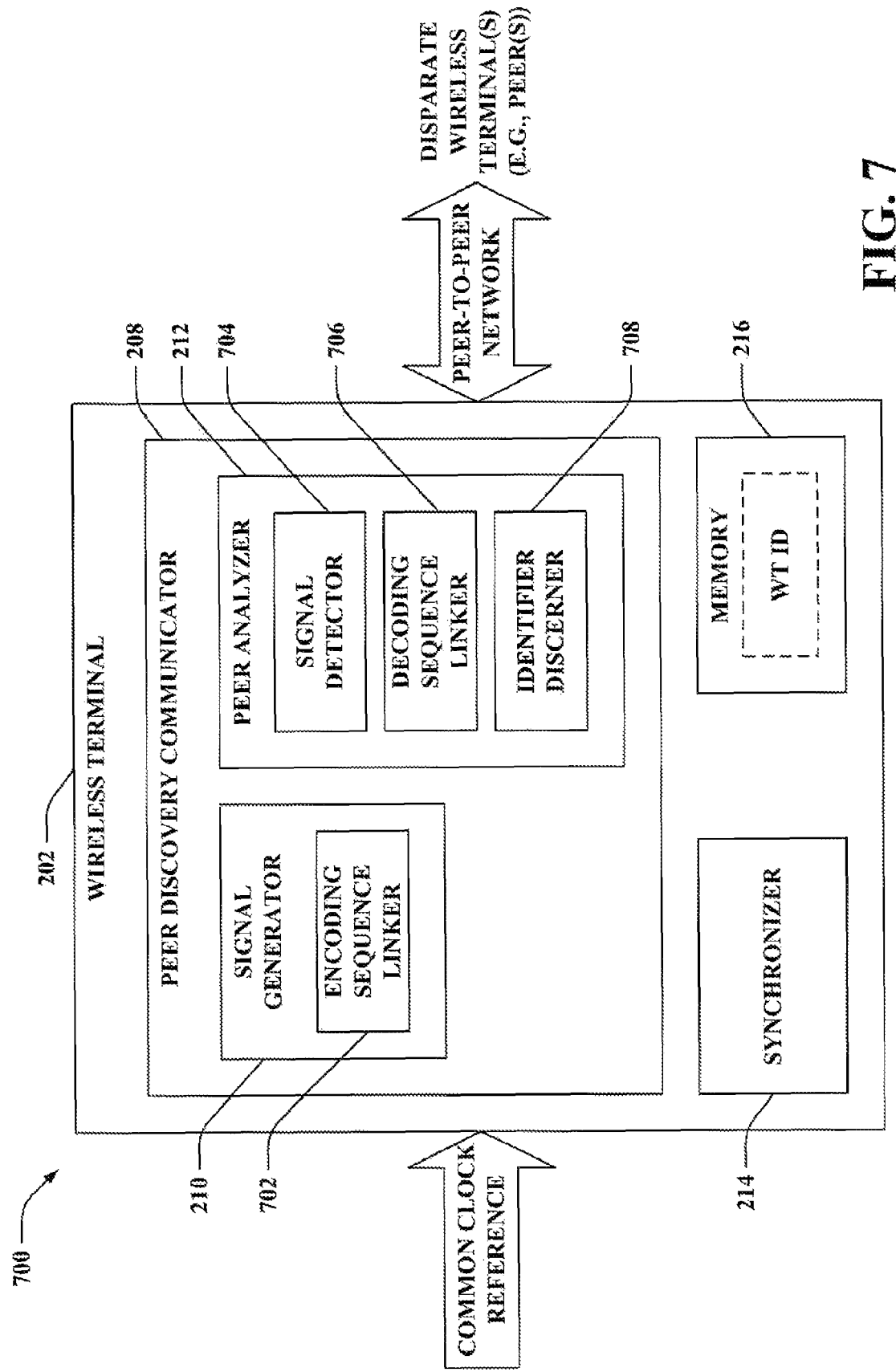
FIG. 7 is an illustration of an example system that enables employing a reversible function for generating a peer discovery signal, where utilization of the reversible function allows identifiers to be deciphered from received signals in a peer-to-peer network.

Now turning to FIG. 7, illustrated is a system 700 that enables employing a reversible function for generating a peer discovery signal, where utilization of the reversible function allows identifiers to be deciphered from received signals in a peer-to-peer network. System 700 includes wireless terminal 202 that communicates via the peer-to-peer network with disparate wireless terminal(s). Wireless terminal 202 may include peer discovery communicator 208, synchronizer 214 and memory 216.

Peer discovery communicator 208 (and similar peer discovery communicator(s) of disparate wireless terminal(s)) may utilize a reversible function for encoding and/or evaluating signals communicated over the peer-to-peer environment. As such, wireless terminal 202 and disparate wireless terminal(s) may abide by a function (e.g., hash function) so that their unique identifiers can be discerned in one peer discovery interval or across a series of peer discovery intervals. Signal generator 210 may employ the reversible function to yield a peer discovery signal based on an identifier of wireless terminal 202 and a time counter, and the signal may be provided to disparate wireless terminal(s) within the peer-to-peer network (e.g., via broadcast). By leveraging the reversible function, the identifier (WT ID) may be deciphered by disparate wireless terminal(s) that detect the peer discovery signal transmitted by wireless terminal 202. For example, the reversible function may be a linear function or a non-linear function.

Signal generator 210 may include an encoding sequence linker 702 that links signal formats in successive peer discovery intervals based upon a fixed and predetermined rule (e.g., reversible function), According to an example, the identifier (WT ID) may include 32 bits or more; however, a beacon signal communicated in a peer discovery interval with 200 symbols and 50 tones provides 10 bits. Thus, encoding sequence linker 702 may enable communicating the identifier by providing portions of the identifier via signals sent in more than one peer discovery interval. Encoding sequence linker 702 utilizes the reversible function to enable the identifier to be recognized over R peer discovery intervals, where R may be any integer (e.g., less than 3, 3, less than 20, . . . ). For example, encoding sequence linker 702 may enable sending a first beacon during a first peer discovery interval, a second beacon during a second peer discovery interval, and so forth, where the beacons may be linked according to the reversible function.

Moreover, peer analyzer 212 may include a signal detector 704, a decoding sequence linker 706, and an identifier discerner 708. Signal detector 704 may obtain signal(s) communicated over the peer-to-peer network during peer discovery intervals. For instance, signal(s) may be generated by disparate wireless terminal(s) (e.g., that employ the reversible function to generate such signals) and/or may correspond to noise or interference. According to an example, signal detector 704 may identify coordinate pairs of symbol(s) and corresponding tone(s) related to the detected signals. Decoding sequence linker 706 may utilize the fixed and predetermined rule to link together signal(s) from successive peer discovery intervals. Further, decoding sequence linker 706 may leverage knowledge of the function employed by an encoding sequence linker of a disparate wireless terminal to identify a sequence of signals from differing peer discovery intervals that correspond to one another. Moreover, identifier discerner 708 may evaluate the sequence of signals to determine the identifier encoded upon such signals. For instance, a list of identified disparate wireless terminals may be updated according to the analysis effectuated by identifier discerner 708.

By leveraging a reversible function, system 700 enables identifying disparate wireless terminals in a peer-to-peer network whether or not wireless terminal 202 has prior knowledge of identifiers related to the disparate wireless terminals (and similarly wireless terminal 202 may be identified by disparate wireless terminal(s)). Such recognition of wireless terminal(s) located within range may enhance coordination of traffic transmission and management of interference among multiple peer-to-peer connections.

According to an illustration, the identifier of wireless terminal 202 (e.g., WT ID retained in memory 216 of wireless terminal 202) may be discoverable from signals transmitted by signal generator 210 of wireless terminal 202. Likewise, unique identifiers respectively corresponding to disparate wireless terminals in the peer-to-peer network may be similarly discoverable (e.g., by peer analyzer 212 of wireless terminal 202). Further, based upon the determined identifier(s), peer analyzers (e.g., peer analyzer 212) may recognize another wireless terminal as a peer. For example, the signal formats transmitted in successive peer discovery intervals may be linked with each other with a fixed and predetermined rule (e.g., by encoding sequence linkers of wireless terminals), which is applicable across the peer-to-peer network. During a particular peer discovery interval, multiple wireless terminals may transmit their signature signals. However, a signature signal in one peer discovery interval may not uniquely identify a transmitting wireless terminal (e.g., wireless terminal 202, disparate wireless terminal(s)). Thus, the transmitting wireless terminal may form a sequence of signature signals transmitted by that single transmitting wireless terminal over successive peer discovery intervals in order to recover the identifier of the transmitting wireless terminal. Moreover, the fixed and predetermined rule helps a receiving wireless terminal (e.g., wireless terminal 202, disparate wireless terminal(s)) form one sequence of the signature signals so as to construct the identifier of the transmitting wireless terminal.

Substantially any fixed and predetermined the may be employed when using beacon signals. Pursuant to an example, the signature signals from one transmitting wireless terminal may have the same position of the selected OFDM symbol in successive intervals. The transmitting wireless terminal may choose to skip a subset of the time intervals for transmission so that it can monitor those time intervals and check whether other transmitting wireless terminals are sending signature signals in those time intervals. In another example, the signature signals from one transmitting wireless terminal have the same position of the selected tone in successive time intervals. The positions of the selected symbols may be a function of the identifier of the transmitting wireless terminal. In yet another example, in two successive time intervals, the signature signals from one transmitting wireless terminal may be sent at tone $y_1$ of selected symbol $x_1$ and at tone $y_2$ of selected symbol $x_2$, respectively; according to this example, the rule may be that $y_2=x_1$ or $x_2=y_1$. It is understood that the above equation may be defined in a modulo sense, where the modulus is a predetermined constant. In general, the linking function represents a constraint that $x_1$, $y_1$, $x_2$, $y_2$ have to satisfy, that is $g(x_1, y_1, x_2, y_2)=0$.

Figure 8:
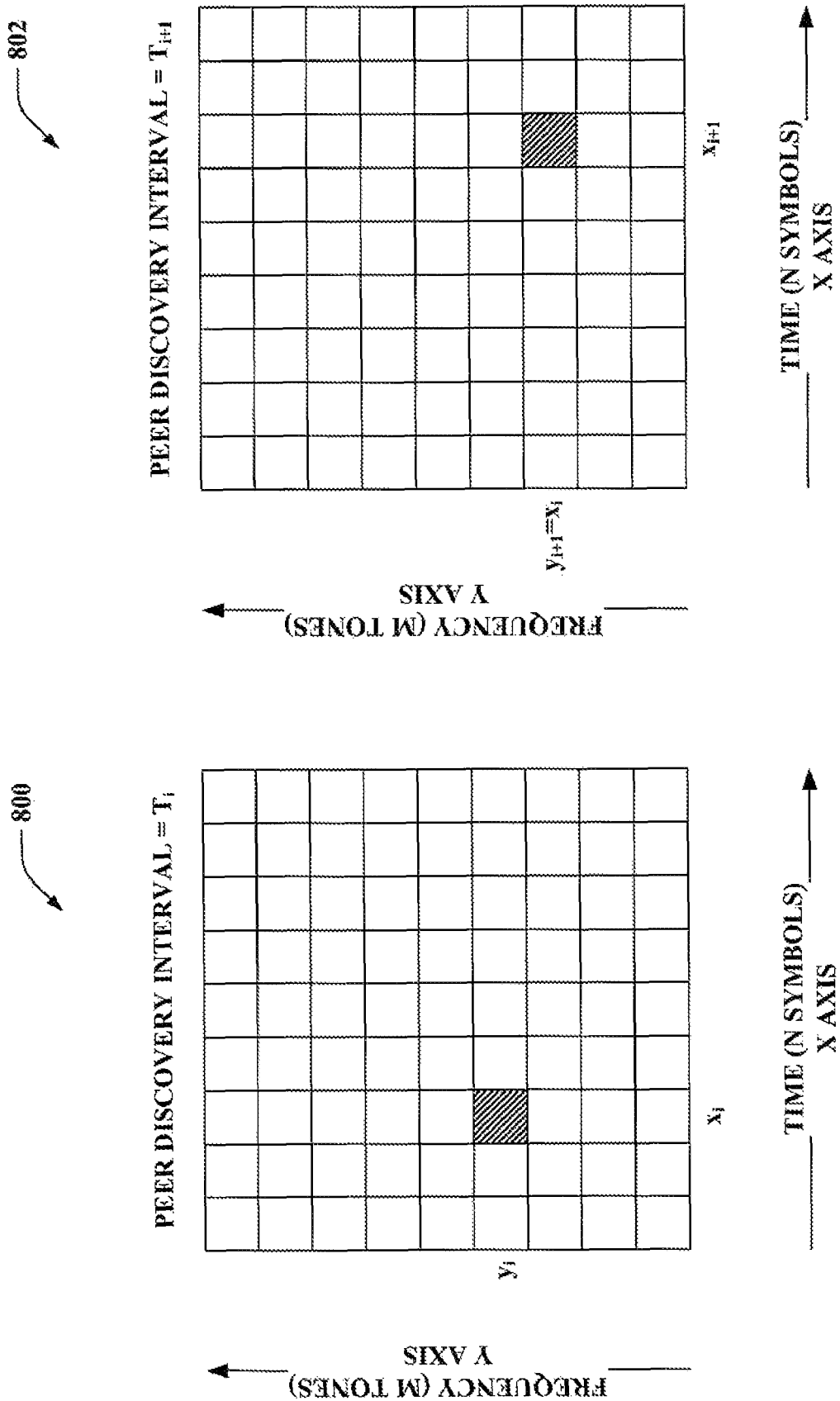
FIG. 8 is an illustration of an example graphical depiction of an evaluation of a linked sequence of peer discovery signals generated with a reversible function.

With reference to FIG. 8, illustrated is an example graphical depiction of an evaluation of a linked sequence of peer discovery signals generated with a reversible function. Time-frequency resource 800 represents a signal (e.g., beacon) generated and/or obtained during a first peer discovery interval, $T_i$, and time-frequency resource 802 represents a signal generated and/or obtained during a second peer discovery interval, $T_{i+1}$. Moreover, the first peer discovery interval, $T_i$, may be the peer discovery interval proceeding the second peer discovery interval, $T_{i+1}$. The time-frequency resources 800-802 may be similar to time-frequency resource 400 of FIG. 4. Further, it is to be appreciated, however, that the claimed subject matter is not limited to these examples.

According to the depicted example, the reversible function may provide information related to the identifier based upon the selected symbol (e.g., x axis). Further, information utilized to link signals from successive peer discovery intervals may be provided by the selected tone (e.g., y axis). For example, the reversible function may provide that $y_{i+1}=x_i$. By way of illustration, a signal may be transmitted during the first peer discovery interval, $T_i$, with a coordinate pair $(x_i, y_i)$. The selected symbol, $x_i$, may provide information associated with a part of the identifier, while the remainder may be included in subsequent signal(s) that may be linked in a sequence. To determine the signal within the next peer discovery interval, $T_{i+1}$, that is included in the sequence, the signal with a selected tone coordinate, $y_{i+1}$, that is equal to $x_i$ is identified. Further, although not shown, during a following peer discovery interval, $T_{i+2}$, $y_{i+2}=x_{i+1}$, and so forth. Although one signal is illustrated during each peer discovery interval, it is contemplated that any number of signals may be transmitted and/or received during each such interval. Additionally, it is to be appreciated that any disparate manner of linking beacon signals between differing peer discovery intervals is intended to fall within the scope of the hereto appended claims. Further, signals from any number of successive peer discovery intervals may be linked to communicate an identifier (e.g., 2, 3, 4, . . . ).

Referring to FIGS. 9-12, methodologies relating to performing peer discovery within a peer-to-peer network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled an the art will understand and appreciate that a methodology could alternatively be represented as a series of interrelated states or events, such as in a state diagram. Moreover, not all illustrated acts may be required to implement a methodology in accordance with one or more embodiments.

Figure 9:
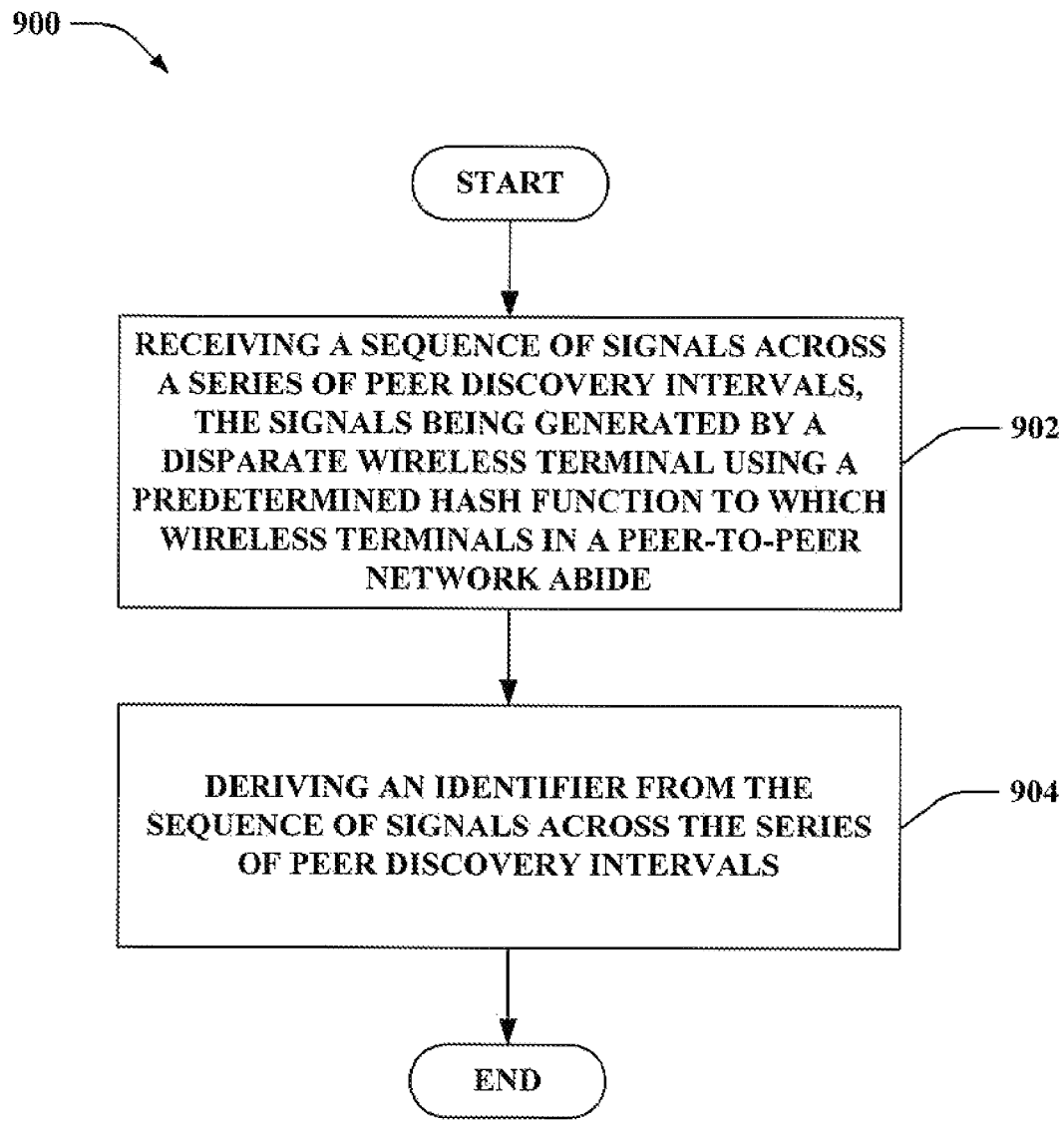
FIG. 9 is an illustration of an example methodology that facilitates identifying a wireless terminal in a peer-to-peer network that employs a reversible function for encoding peer discovery signals.

Turning to FIG. 9, illustrated is a methodology 900 that facilitates identifying a wireless terminal (e.g., disparate wireless terminal) in a peer-to-peer network that employs a reversible function for encoding peer discovery signals. At 902, a sequence of signals (e.g., first signals) may be received across a series of peer discovery intervals, wherein the signals may be generated by a disparate wireless terminal using a predetermined hash function to which wireless terminals in a peer-to-peer network abide. The hash function may have constrained the disparate wireless terminal that generated and transmitted the sequence of signals (e.g., the disparate wireless terminal from which the sequence of signals may be obtained). Further, the signals may have been generated based on an identifier (e.g., of the transmitting wireless terminal) and a time counter variable (e.g., synchronized time variable associated with each peer discovery interval). For example, the hash function may be a linear function, a non-linear function, and so forth. At 904, an identifier may be derived from the sequence of signals (e.g., first signals) across the series of peer discovery intervals. The hash function may be reversible; thus, the identifier corresponding to the disparate wireless terminal that generated and transmitted the sequence of signals may be determined by a receive wireless terminal from the received signal. For example, the identifier may be obtained over R peer discovery intervals, where R may be any integer (e.g., 3, less than 3, less than 20, . . . ).

Pursuant to another example, timing associated with the peer discovery intervals may be synchronized. In particular, a signal (e.g., second signal) may be received from a signal source, wherein the signal source may be a base station, an access node, or a satellite. The second signal, for instance, may be broadcast over the peer-to-peer network. Further, timing information may be derived from the second signal. Thus, peers within the peer-to-peer network may identify substantially similar timing information since the peers evaluate a substantially similar signal (e.g., the second signal). Moreover, a time position of the peer discovery intervals in the series may be determined from the derived timing information.

Moreover, a time counter variable may be leveraged in connection with deriving the identifier from the received sequence of signal. For instance, a third signal may be received from the signal source. It is contemplated that the third signal may be the second signal and/or may be a signal distinct from the second signal. Additionally, a time counter variable may be derived from the third signal. The value of the time counter variable, for example, may vary between successive peer discovery intervals based on a predetermined function. Moreover, the time counter variable may be used to derive the identifier.

It is to be appreciated that each of the peer discovery intervals may include a plurality of symbols and each symbol may include a plurality of tones. Further, each of the signals (e.g., first signals) may include one or a plurality of beacon signals. For example, a beacon signal may include one tone in one symbol period. Further, the received power of the tone of the beacon signal may be at least 5 dB higher than an average per-tone power of other tones in the same symbol period.

Signals in differing peer discovery intervals may be linked according to a predetermined linking constraint function. For example, it may be determined whether at least one beacon signal is present in each peer discovery interval of the series. An index of the symbol and an index of the tone of each beacon signal may be estimated. Further, a predetermined linking constraint function may be applied to determine whether a first beacon signal in one peer discovery interval and a second beacon signal in a different peer discovery interval in the series are associated with the same identifier. Accordingly, the first beacon signal and the second beacon signal may be used to derive the identifier if the first beacon signal and the second beacon signal are determined to be associated with the same identifier. For example, the predetermined linking function may be a constraint function that symbol indices and tone indices of the first beacon signal and the second beacon signal have to satisfy. By way of further illustration, the constraint function may be such that the symbol index of the first beacon signal is equal to at least one of the tone index or the symbol index of the second beacon signal in a modulo sense and the modulus is a predetermined constant.

According to another example, it is contemplated that the identifier may be determined based at least in part upon a stored list of known identifiers. For example, the derived identifier may be compared with the list of known identifiers to determine whether the derived identifier matches any of the known identifiers. Moreover, a corresponding wireless terminal or user may be determined to be present in a vicinity if the derived identifier matches one known identifier.

According to another example, a disparate sequence of signals (e.g., fourth signals) may be generated based upon the hash function; the hash function may consider a disparate identifier (e.g., second identifier, associated with a wireless terminal generating the disparate sequence or a user using such wireless terminal) and/or a time counter variable. Pursuant to this example, the disparate sequence of signals may be transmitted over a series of peer discovery intervals (e.g., that may be similar or different from the series across which the received sequence was obtained) to enable determination of the disparate identifier by disparate wireless terminal(s) to which the signals may be communicated.

Figure 10:
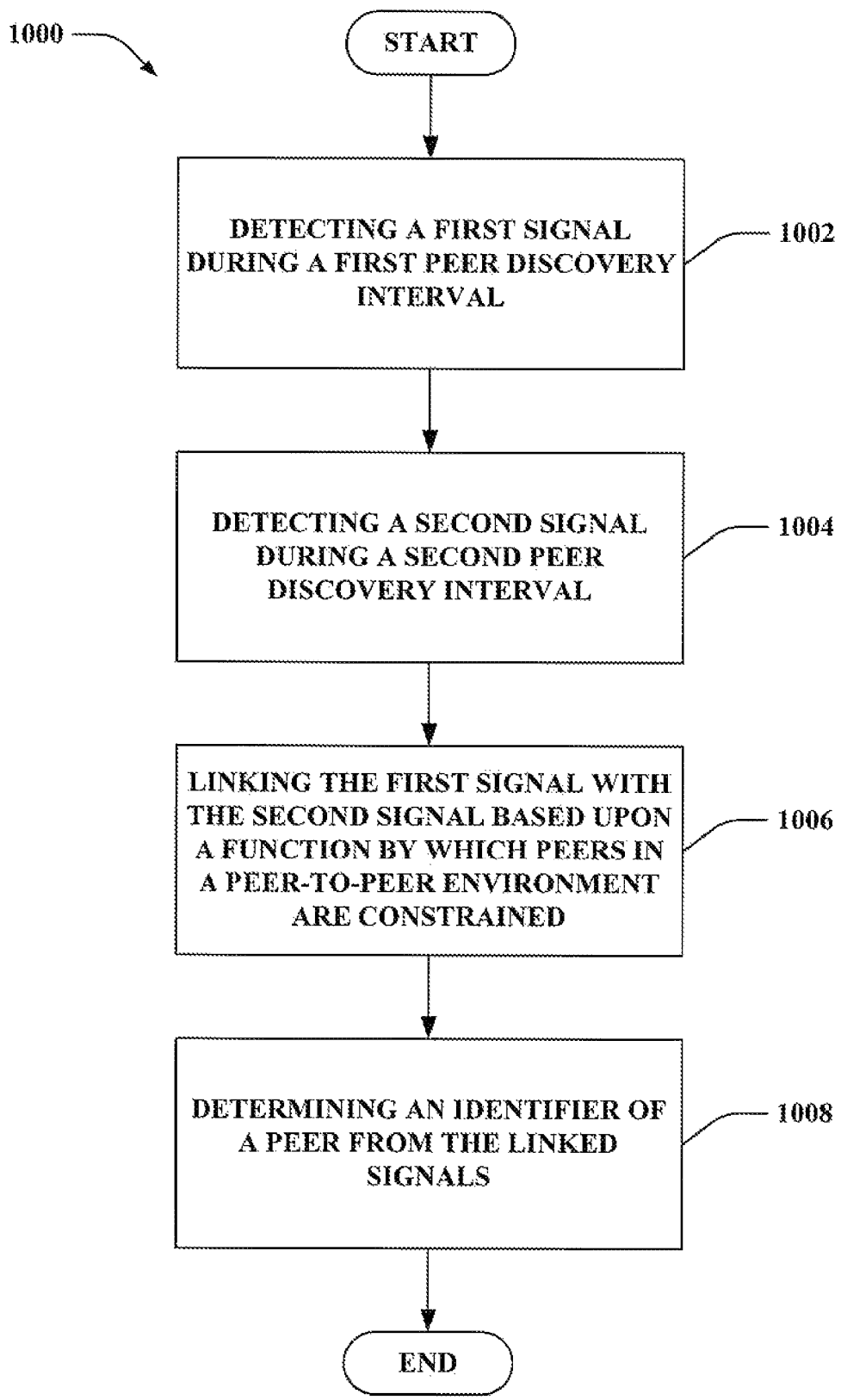
FIG. 10 is an illustration of an example methodology that facilitates decoding a sequence of signals obtained from a peer in a peer-to-peer environment.

Now referring to FIG. 10, illustrated is a methodology 1000 that facilitates decoding a sequence of signals obtained from a peer in a peer-to-peer environment. At 1002, a first signal may be detected during a first peer discovery interval. For example, the signal may be a beacon signal. Further, for instance, the signal may be a beacon signal; accordingly, a tone on a symbol (e.g., OFDM symbol) may be positioned within the first peer discovery interval. The tone may be a high energy tone (e.g., the received power is high). At 1004, a second signal may be detected during a second peer discovery interval. It is contemplated that any number of disparate signals may also be detected during the first and/or second peer discovery interval. At 1006, the first signal may be linked with the second signal based upon a function by which peers in a peer-to-peer environment are constrained. For instance, the function may be a fixed and predetermined rule utilized to encode and decode peer discovery signals communicated in the peer-to-peer environment. It is to be appreciated that substantially any such function (e.g., reversible) is intended to fall within the scope of the claimed subject matter. Moreover, more than two signals from differing peer discovery intervals may be linked to yield a sequence of signals that correspond to a transmitting peer. According to another example, each of the signals may provide information associated with how to link that signal with a next signal. At 1008, a identifier of a peer may be determined from the linked signals. Pursuant to an example, each of the signals may provide information associated with a portion of the identifier. By way of further illustration, a data capacity associated with each of the signals may be smaller than the size of the identifier (e.g., each signal may provide 10 bits of information while the identifier may be 32 bits or greater).

Moreover, the function (e.g., reversible function) may be employed to encode and transmit signal(s) during peer discovery interval(s). Further, the function may enable providing linking related information and/or information pertaining to a identifier of a wireless terminal that encodes and transmits the signal(s). According to an illustration, a wireless terminal may encode and send signals to peer(s) that include information related to an identifier of the wireless terminal and how to link the signals; the wireless terminal may also receive and decode signals from peer(s) based on linking information from the received signals to determine identifier(s) of such peer(s).

Figure 11:
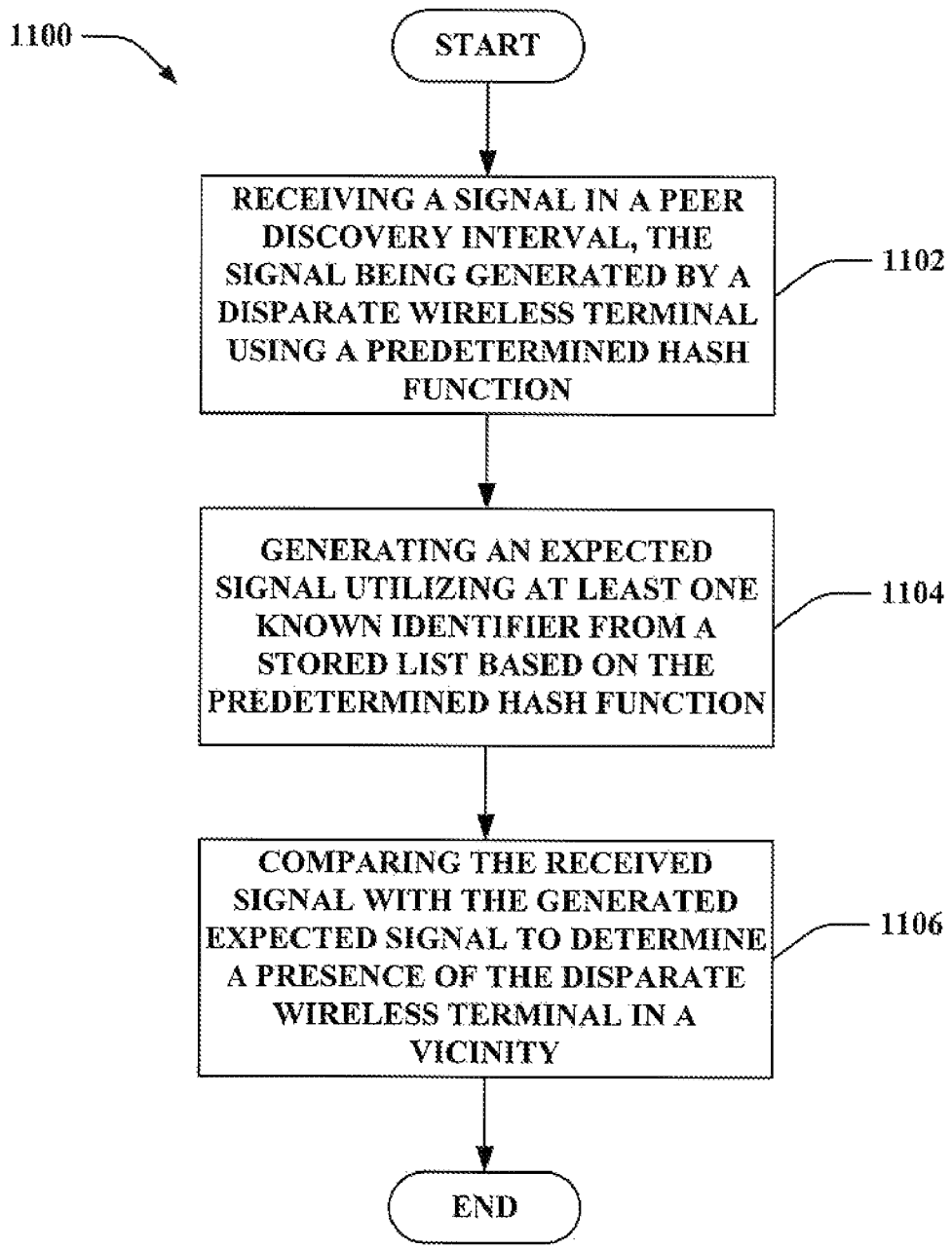
FIG. 11 is an illustration of an example methodology that facilitates identifying a disparate wireless terminal in a peer-to-peer network.

With reference to FIG. 11, illustrated is a methodology 1100 that facilitates identifying a disparate wireless terminal in a peer-to-peer network. At 1102, a signal (e.g., first signal) may be received in a peer discovery interval; the signal may be generated by a disparate wireless terminal, using a predetermined hash function. The predetermined hash function may be irreversible; however, it is to be appreciated that a reversible function may be employed. The signal, for example, may be a beacon signal. Further, since the signal may be yielded by employing the irreversible function, an identifier associated with the disparate wireless terminal utilized to generate the signal may be unable to be directly calculated. Moreover, the signal may be analyzed to determine a coordinate pair that includes a selected symbol and a selected tone. At 1104, an expected signal may be generated utilizing at least one known identifier from a stored list based on the predetermined hash function. For example, the predetermined hash function employed to yield the generated expected signal may be substantially similar to the predetermined hash function employed by the disparate wireless terminal to generate the signal. Pursuant to an illustration, the predetermined hash function may consider a list of known identifiers (e.g., buddy list) and/or a time associated with a peer discovery interval (e.g., time counter variable). The known identifiers may be pre-stored in the memory of the wireless terminal. At 1106, the received signal may be compared with the generated expected signal to determine a presence of the disparate wireless terminal in a vicinity. The disparate wireless terminal may correspond to the known identifier used to generate the expected signal. For example, a plurality of expected signals may be generated, and one of the expected signals that matches the received signal may be recognized. Further, the peer corresponding to the matching expected signal may be determined to be the source of the signal (e.g., the disparate wireless terminal) with a degree of probability. Moreover, if such peer is repeatedly matched to received signals during distinct peer discovery intervals, a higher probability may be allocated to the peer. Additionally, an energy level associated with the received signal may impact the probability; thus, a high energy level of the received signal may correspond to a higher probability as compared to a low energy level of the received signal. Pursuant to a further example, a disparate signal may be generated utilizing the predetermined hash function, and such disparate signal may be transmitted over the peer-to-peer network for a similar comparison at differing peers.

Pursuant to another example, timing associated with the peer discovery intervals may be synchronized. In particular, a signal (e.g., second signal) may be received from a signal source, wherein the signal source may be a base station, an access node, or a satellite. The second signal, for instance, may be broadcast over the peer-to-peer network. Further, timing information may be derived from the second signal. Thus, peers within the peer-to-peer network may identify substantially similar timing information since the peers evaluate a substantially similar signal (e.g., the second signal). Moreover, a time position of the peer discovery intervals in a series may be determined from the derived timing information.

Moreover, a time counter variable may be leveraged in connection with deriving the identifier from the received sequence of signal. For instance, a third signal may be received from the signal source. It is contemplated that the third signal may be the second signal and/or may be a signal distinct from the second signal. Additionally, a time counter variable may be derived from the third signal. The value of the time counter variable, for example, may vary between successive peer discovery intervals based on a predetermined function. Moreover, the time counter variable may be used to generate the expected signal.

It is to be appreciated that each of the peer discovery intervals may include a plurality of symbols and each symbol may include a plurality of tones. Further, each of the signals (e.g., first signal) may include one or a plurality of beacon signals. For example, a beacon signal may include one tone in one symbol period. Further, the received power of the tone of the beacon signal may be at least 5 dB higher than an average per-tone power of other tones in the same symbol period.

The known identifier(s) retained in memory may be utilized to generate expected signal(s). For example, a determination may be made as to whether at least one beacon signal is present in the peer discovery interval. Further, an index of the symbol and an index of the tone of the received beacon may be estimated. Thus, generating the expected signal may further include calculating the index of the symbol and the index of the tone of the expected signal (e.g. expected beacon signal) based on the predetermined hash function using at least one of the known identifiers and the time counter variable. Moreover, a value (e.g., greater than zero) may be assigned to a probability that the disparate wireless terminal corresponding to the known identifier used to generate the expected signal is present in the vicinity.

Moreover, the probability may be adjusted. For example, a signal (e.g., fourth signal) may be received during another peer discovery interval (e.g., second peer discovery interval), wherein the fourth signal may be generated by the disparate wireless terminal using the predetermined hash function. Further, first and second peer discovery intervals may be distinct from one another. An expected signal may be generated using the known identifier based on the predetermined hash function. Moreover, the received fourth signal may be compared with the generated expected signal. Thereafter, the value of the probability that a wireless terminal corresponding to the known identifier is present in the vicinity may be increased if the comparison result indicates that the received fourth signal is substantially similar to the generated expected signal and if the probability is less than 1. Additionally, the value of the probability that the wireless terminal corresponding to the known identifier is present in the vicinity may be decreased if the comparison indicates that the received fourth signal is different from the generated expected signal.

By way of further example, an energy level of the received first signal may be evaluated. A value of a probability may be determined based upon the energy level.

Figure 12:
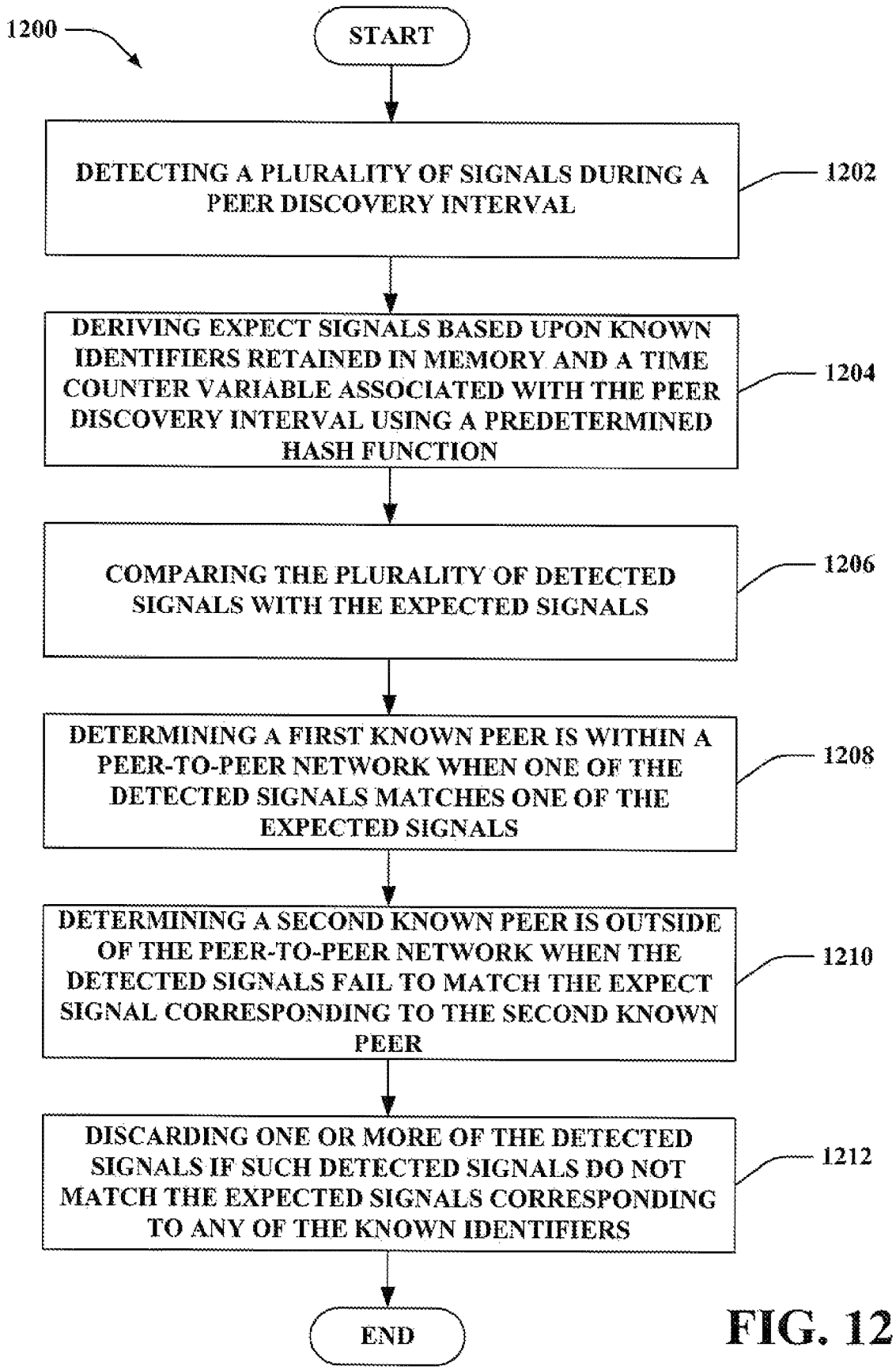
FIG. 12 is an illustration of an example methodology that facilitates analyzing signals obtained during a peer discovery interval in a peer-to-peer network.

Now turning to FIG. 12, illustrated is a methodology 1200 that facilitates analyzing signals obtained during a peer discovery interval in a peer-to-peer network. At 1202, a plurality of signals may be detected during a peer discovery interval. For instance, the plurality of signals may be peer discovery signals transmitted by peer(s) (e.g., known or unknown) and/or noise. At 1204, expected signals may be derived based upon known identifiers retained in memory and a time counter variable associated with the peer discovery interval using a predetermined hash function (e.g., irreversible function). For example, a list of known identifiers corresponding to known peers (e.g., buddy peers) may be retained in memory. Pursuant to an illustration, expected tone-expected symbol pairs may be determined. At 1206, the plurality of detected signals may be compared with the expected signals. At 1208, a first known peer is determined to be within a peer-to-peer network when one of the detected signals matches one of the expected signals. At 1210, a second known peer is determined to be outside of the peer-to-peer network when the detected signals fail to match the expected signal corresponding to the second known peer. At 1212, one or more of the detected signals may be discarded if such detected signals do not match the expected signals corresponding to any of the known identifiers.

It will be appreciated that, in accordance with one or more aspects described herein, inferences can be made regarding discovering and identifying peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying sources of peer discovery signals in a peer-to-peer network. In accordance with another example, an inference may be made related to estimating a probability of a peer being located within proximity based upon a number of detected signals that match an expected signal format and/or energy levels associated with detected signals. It will be appreciated that the foregoing examples are illustrative in nature and are not intended to limit the number of inferences that can be made or the manner in which such inferences are made in conjunction with the various embodiments and/or methods described herein.

Figure 13:
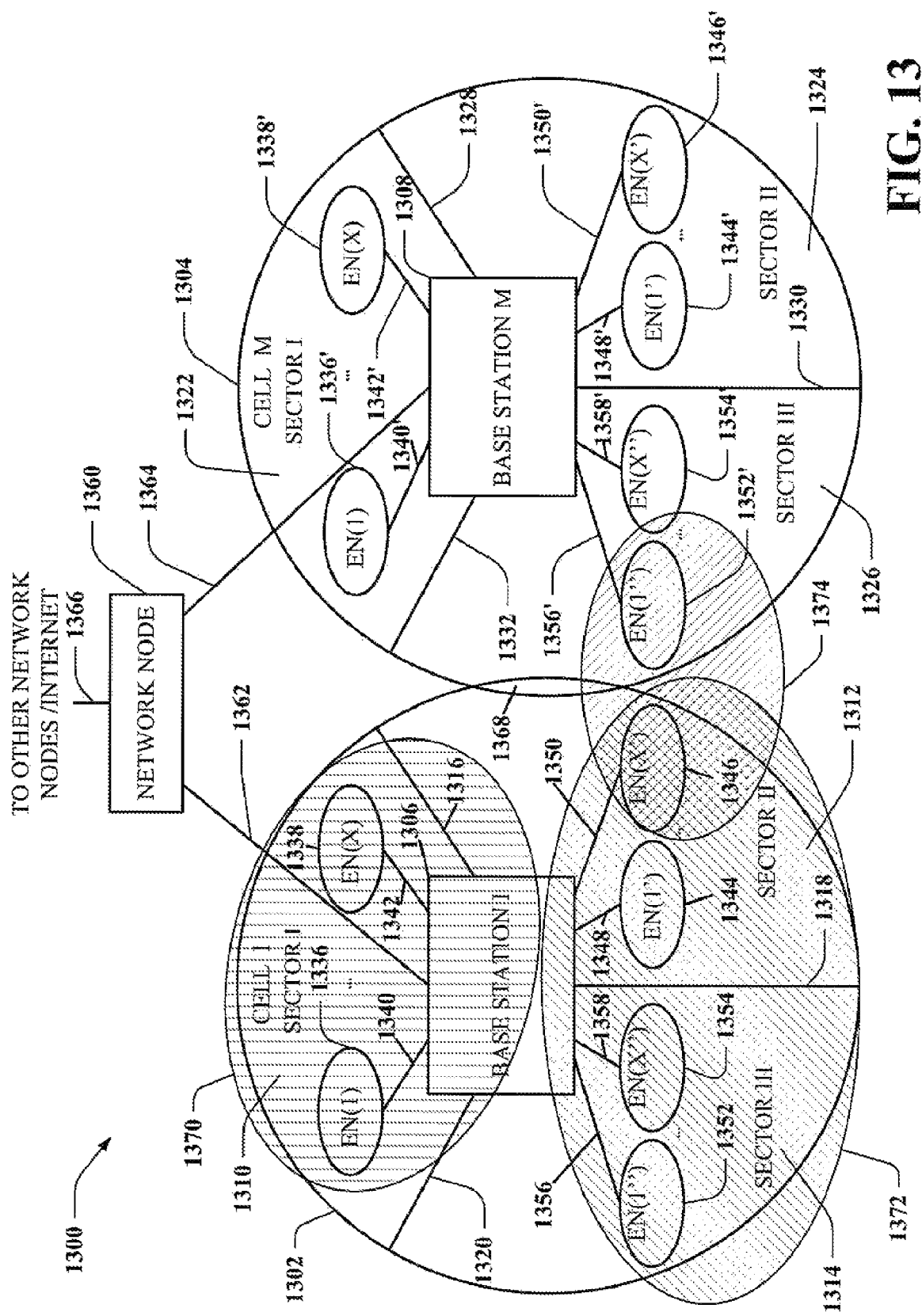
FIG. 13 is an illustration of an example communication system implemented in accordance with various aspects including multiple cells.

FIG. 13 depicts an example communication system 1300 implemented in accordance with various aspects including multiple cells: cell I 1302, cell M 1304. Note that neighboring cells 1302, 1304 overlap slightly, as indicated by cell boundary region 1368, thereby creating potential for signal interference between signals transmitted by base stations in neighboring cells. Each cell 1302, 1304 of system 1300 includes three sectors. Cells which have not be subdivided into multiple sectors (N=1), cells with two sectors (N=2) and cells with more than 3 sectors (N>3) are also possible in accordance with various aspects. Cell 1302 includes a first sector, sector I 1310, a second sector, sector II 1312, and a third sector, sector III 1314. Each sector 1310, 1312, 1314 has two sector boundary regions; each boundary region is shared between two adjacent sectors.

Sector boundary regions provide potential for signal interference between signals transmitted by base stations in neighboring sectors. Line 1316 represents a sector boundary region between sector I 1310 and sector II 1312; line 1318 represents a sector boundary region between sector II 1312 and sector III 1314; line 1320 represents a sector boundary region between sector III 1314 and sector I 1310. Similarly, cell M 1304 includes a first sector, sector I 1322, a second sector, sector II 1324, and a third sector, sector III 1326. Line 1328 represents a sector boundary region between sector I 1322 and sector II 1324; line 1330 represents a sector boundary region between sector II 1324 and sector II 1326; line 1332 represents a boundary region between sector III 1326 and sector I 1322. Cell I 1302 includes a base station (BS), base station I 1306, and a plurality of end nodes (ENs) (e.g., wireless terminals) in each sector 1310, 1312, 1314. Sector I 1310 includes EN(1) 1336 and EN(X) 1338 coupled to BS 1306 via wireless links 1340, 1342, respectively; sector II 1312 includes EN(1') 1344 and EN(X') 1346 coupled to BS 1306 via wireless links 1348, 1350, respectively; sector III 1314 includes EN(1") 1352 and EN(X") 1354 coupled to BS 1306 via wireless links 1356, 1358, respectively. Similarly, cell M 1304 includes base station M 1308, and a plurality of end nodes (ENs) in each sector 1322, 1324, 1326. Sector I 1322 includes EN(1) 1336' and EN(X) 1338' coupled to BS M 1308 via wireless links 1340', 1342', respectively; sector II 1324 includes EN(1') 1344' and EN(X') 1346' coupled to BS M 1308 via wireless links 1348', 1350', respectively; sector 3 1326; includes EN(1") 1352' and EN(X") 1354' coupled to BS 1308 via wireless links 1356', 1358', respectively.

System 1300 also includes a network node 1360 which is coupled to BS I 1306 and BS M 1308 via network links 1362, 1364, respectively. Network node 1360 is also coupled to other network nodes, e.g., other base stations, AAA server nodes, intermediate nodes, routers, etc. and the Internet via network link 1366. Network links 1362, 1364, 1366 may be, e.g., fiber optic cables. Each end node, e.g., EN(1) 1336 may be a wireless terminal including a transmitter as well as a receiver. The wireless terminals, e.g., EN(1) 1336 may move through system 1300 and may communicate via wireless links with the base station in the cell in which the EN is currently located. The wireless terminals, (WTs) e.g., EN(1) 1336, may communicate with peer nodes, e.g., other WTs in system 1300 or outside system 1300 via a base station, e.g., BS 1306, and/or network node 1360. WTs, e.g., EN(1) 1336 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Local area peer-to-peer communication may also be supported by communication system 1300. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 1370, 1372, and 1374. Although three peer-to-peer networks 1370-1374 are depicted, it is to be appreciated that any number, size, shape, etc. of peer-to-peer networks may be supported. For instance, each peer-to-peer network 1370-1374 may support transfer of signals directly between wireless terminals. Further, each peer-to-peer network 1370-1374 may include wireless terminals within a similar geographic area (e.g., within range of one another). For example, EN(1) 1336 may communicate with EN(X) 1338 by way of the local area peer-to-peer network 1370. However, it is to be appreciated that wireless terminals need not be associated with the same sector and/or cell to be included in a common peer-to-peer network. Further, peer-to-peer networks may overlap (e.g., EN(X') 1346 may leverage peer-to-peer networks 1372 and 1374). Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 14:
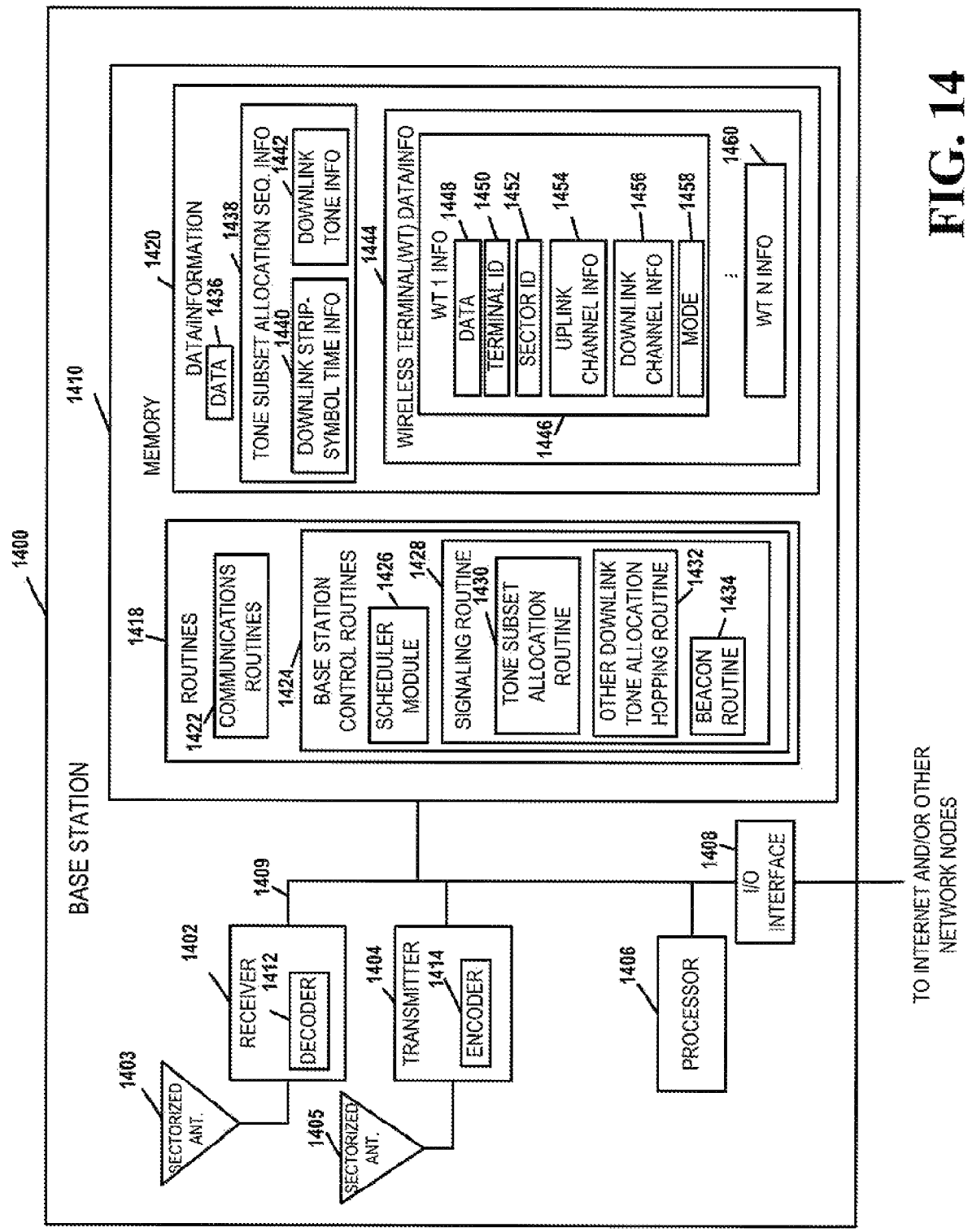
FIG. 14 is an illustration of an example base station in accordance with various aspects.

FIG. 14 illustrates an example base station 1400 in accordance with various aspects. Base station 1400 implements tone subset allocation sequences, with different tone subset allocation sequences generated for respective different sector types of the cell. Base station 1400 may be used as any one of base stations 1306, 1308 of the system 1300 of FIG. 13. The base station 1400 includes a receiver 1402, a transmitter 1404, a processor 1406, e.g., CPU, an input/output interface 1408 and memory 1410 coupled together by a bus 1409 over which various elements 1402, 4004, 1406, 1408, and 1410 may interchange data and information.

Sectorized antenna 1403 coupled to receiver 1402 is used for receiving data and other signals, e.g., channel reports, from wireless terminals transmissions from each sector within the base station's cell. Sectorized antenna 1405 coupled to transmitter 1404 is used for transmitting data and other signals, e.g., control signals, pilot signal, beacon signals, etc. to wireless terminals 1500 (see FIG. 15) within each sector of the base station's cell. In various aspects, base station 1400 may employ multiple receivers 1402 and multiple transmitters 1404, e.g., an individual receiver 1402 for each sector and an individual transmitter 1404 for each sector. Processor 1406, may be, e.g., a general purpose central processing unit (CPU). Processor 1406 controls operation of base station 1400 under direction of one or more routines 1418 stored in memory 1410 and implements the methods. I/O interface 1408 provides a connection to other network nodes, coupling the BS 1400 to other base stations, access routers, AAA server nodes, etc., other networks, and the Internet. Memory 1410 includes routines 1418 and data/information 1420.

Data/information 1420 includes data 1436, tone subset allocation sequence information 1438 including downlink strip-symbol time information 1440 and downlink tone information 1442, and wireless terminal (WT) data/info 1444 including a plurality of sets of WT information: WT 1 info 1446 and WT N info 1460. Each set of WT info, e.g., WT 1 info 1446 includes data 1448, terminal ID 1450, sector ID 1452, uplink channel information 1454, downlink channel information 1456, and mode information 1458.

Routines 1418 include communications routines 1422 and base station control routines 1424. Base station control routines 1424 includes a scheduler module 1426 and signaling routines 1428 including a tone subset allocation routine 1430 for strip-symbol periods, other downlink tone allocation hopping routine 1432 for the rest of symbol periods, e.g., non strip-symbol periods, and a beacon routine 1434.

Data 1436 includes data to be transmitted that will be sent to encoder 1414 of transmitter 1404 for encoding prior to transmission to WTs, and received data from WTs that has been processed through decoder 1412 of receiver 1402 following reception. Downlink strip-symbol time information 1440 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1442 includes information including a carrier frequency assigned to the base station 1400, the number and frequency of tones, and the set of tone subsets to be allocated to the strip-symbol periods, and other cell and sector specific values such as slope, slope index and sector type.

Data 1448 may include data that WT1 1500 has received from a peer node, data that WT 1 1500 desires to be transmitted to a peer node, and downlink channel quality report feedback information. Terminal ID 1450 is a base station 1400 assigned ID that identifies WT 1 1500. Sector ID 1452 includes information identifying the sector in which WT1 1500 is operating. Sector ID 1452 can be used, for example, to determine the sector type. Uplink channel information 1454 includes information identifying channel segments that have been allocated by scheduler 1426 for WT1 1500 to use, e.g., uplink traffic channel segments for data, dedicated uplink control channels for requests, power control, timing control, etc. Each uplink channel assigned to WT1 1500 includes one or more logical tones, each logical tone following an uplink hopping sequence. Downlink channel information 1456 includes information identifying channel segments that have been allocated by scheduler 1426 to carry data and/or information to WT1 1500, e.g., downlink traffic channel segments for user data. Each downlink channel assigned to WT1 1500 includes one or more logical tones, each following a downlink hopping sequence. Mode information 1458 includes information identifying the state of operation of WT1 1500, e.g., sleep, hold, on.

Communications routines 1422 control the base station 1400 to perform various communications operations and implement various communications protocols. Base station control routines 1424 are used to control the base station 1400 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1428 controls the operation of receiver 1402 with its decoder 1412 and transmitter 1404 with its encoder 1414. The signaling routines 1428 is responsible for controlling the generation of transmitted data 1436 and control information. Tone subset allocation routine 1430 constructs the tone subset to be used in a strip-symbol period using the method of the aspect and using data/information 1420 including downlink strip-symbol time info 1440 and sector ID 1452. The downlink tone subset allocation sequences will be different for each sector type in a cell and different for adjacent cells. The WTs 1500 receive the signals in the strip-symbol periods in accordance with the downlink tone subset allocation sequences; the base station 1400 uses the same downlink tone subset allocation sequences in order to generate the transmitted signals. Other downlink tone allocation hopping routine 1432 constructs downlink tone hopping sequences, using information including downlink tone information 1442, and downlink channel information 1456, for the symbol periods other than the strip-symbol periods. The downlink data tone hopping sequences are synchronized across the sectors of a cell. Beacon routine 1434 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 15:
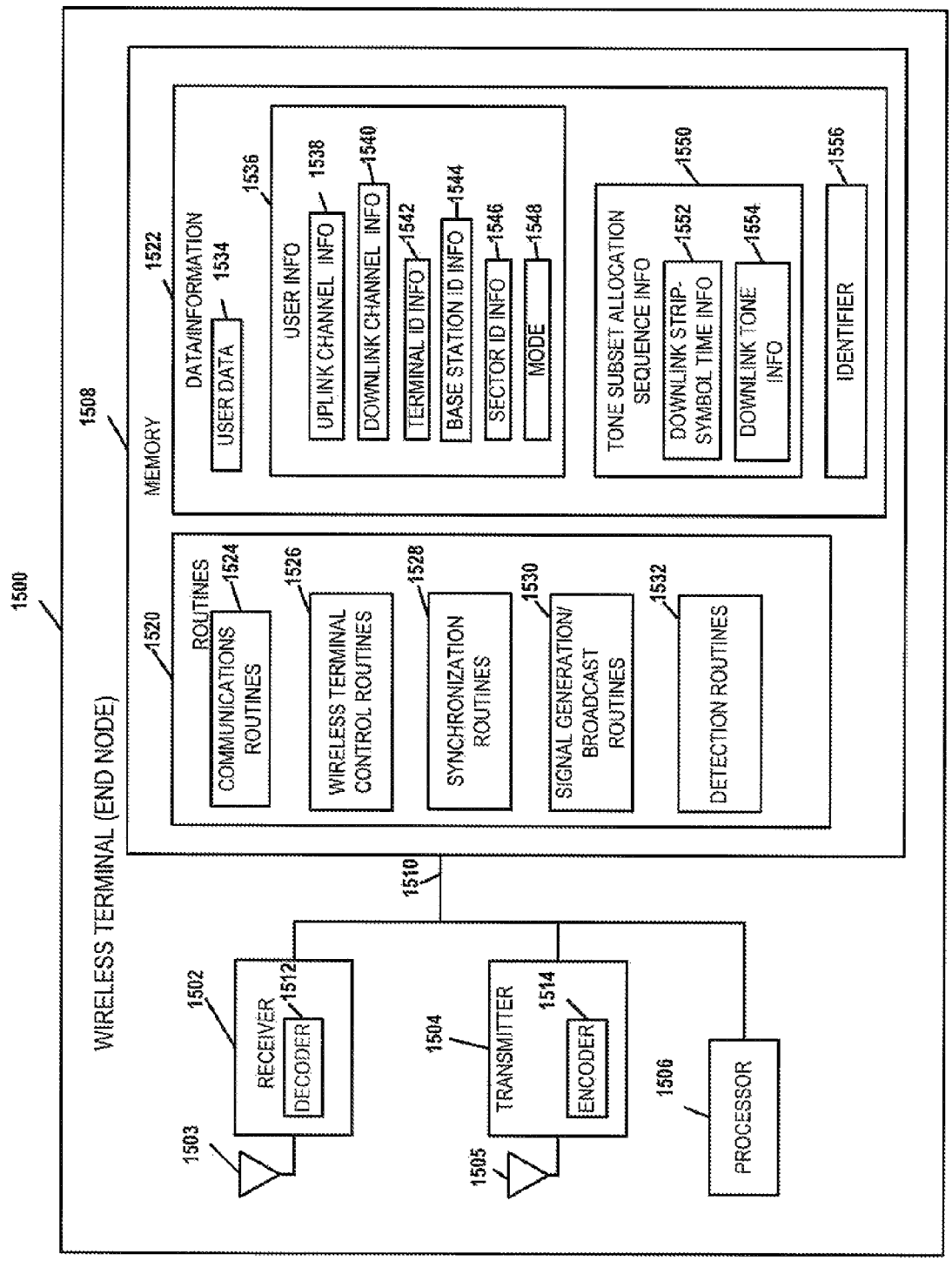
FIG. 15 is an illustration of an example wireless terminal (e.g., mobile device, end node, . . . ) implemented in accordance with various aspects described herein.

FIG. 15 illustrates an example wireless terminal (e.g., end node, mobile device, . . . ) 1500 which can be used as any one of the wireless terminals (e.g., end nodes, mobile devices, . . . ), e.g., ENP(1) 1336, of the system 1300 shown in FIG. 13. Wireless terminal 1500 implements the tone subset allocation sequences. Wireless terminal 1500 includes a receiver 1502 including a decoder 1512, a transmitter 1504 including an encoder 1514, a processor 1506, and memory 1508 which are coupled together by a bus 1510 over which the various elements 1502, 1504, 1506, 1508 can interchange data and information. An antenna 1503 used for receiving signals from a base station 1400 (and/or a disparate wireless terminal) is coupled to receiver 1502. An antenna 1505 used for transmitting signals, e.g., to base station 1400 (and/or a disparate wireless terminal) is coupled to transmitter 1504.

The processor 1506 (e.g., a CPU) controls operation of wireless terminal 1500 and implements methods by executing routines 1520 and using data/information 1522 in memory 1508.

Data/information 1522 includes user data 1534, user information 1536, tone subset allocation sequence information 1550, and an identifier 1556. User data 1534 may include data, intended for a peer node, which will be routed to encoder 1514 for encoding prior to transmission by transmitter 1504 to base station 1400, and data received from the base station 1400 which has been processed by the decoder 1512 in receiver 1502. User information 1536 includes uplink channel information 1538, downlink channel information 1540, terminal ID information 1542, base station ID information 1544, sector ID information 1546, and mode information 1548. Uplink channel information 1538 includes information identifying uplink channels segments that have been assigned by base station 1400 for wireless terminal 1500 to use when transmitting to the base station 1400. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1540 includes information identifying downlink channel segments that have been assigned by base station 1400 to WT 1500 for use when BS 1400 is transmitting data/information to WT 1500. Downlink channels may include downlink traffic channels and assignment channels, each downlink channel including one or more logical tone, each logical tone following a downlink hopping sequence, which is synchronized between each sector of the cell.

User info 1536 also includes terminal ID information 1542, which is a base station 1400 assigned identification, base station ID information 1544 which identifies the specific base station 1400 that WT has established communications with, and sector ID info 1546 which identifies the specific sector of the cell where WT 1500 is presently located. Base station ID 1544 provides a cell slope value and sector ID info 1546 provides a sector index type; the cell slope value and sector index type may be used to derive tone hopping sequences. Mode information 1548 also included in user info 1536 identifies whether the WT 1500 is in sleep mode, hold mode, or on mode.

Tone subset allocation sequence information 1550 includes downlink strip-symbol time information 1552 and downlink tone information 1554. Downlink strip-symbol time information 1552 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1554 includes information including a carrier frequency assigned to the base station 1400, the number and frequency of tones, and the set of tone subsets to be allocated to the strip-symbol periods, and other cell and sector specific values such as slope, slope index and sector type.

Routines 1520 include communications routines 1524, wireless terminal control routines 1526, synchronization routines 1528, signal generation/broadcast routines 1530, and detection routines 1532. Communications routines 1524 control the various communications protocols used by WT 1500. For example, communications routines 1524 may enable communicating via a wide area network (e.g., with base station 1400) and/or a local area peer-to-peer network (e.g., directly with disparate wireless terminal(s)). By way of further example, communications routines 1524 may enable receiving a broadcast signal (e.g., from base station 1400). Wireless terminal control routines 1526 control basic wireless terminal 1500 functionality including the control of the receiver 1502 and transmitter 1504. Synchronization routines 1528 control synchronizing wireless terminal 1500 to a received signal (e.g., from base station 1400). Peers within a peer-to-peer network may also be synchronized to the signal. For example, the received signal may be a Beacon, a PN (pseudo random) sequence signal, a pilot signal, etc. Further, the signal may be periodically obtained and a protocol (e.g., associated with synchronization routines 1528) also known to peers may be utilized to identify intervals corresponding to distinct functions (e.g., peer discovery, paging, traffic). Signal generation/broadcast routines 1530 control creating a message for transmission during an identified peer discovery interval. A symbol and/or tone associated with the message may be selected based upon a protocol (e.g., associated with signal generation/broadcast routines 1530). Moreover, signal generation/broadcast routines 1530 may control sending the message to peers within the peer-to-peer network. Signal generation/broadcast routines 1530 may utilize a reversible function or an irreversible function to transfer peer discovery signals based upon identifier 1556. Detection routines 1532 control detection and identification of peers based upon messages received during an identified peer discovery interval. Detection routines 1532 may utilize a similar function (e.g., reversible, irreversible) as compared to signal generation/broadcast routines 1530 to determine an identity of a peer. Further, detection routines 1532 may identify peers based at least in part upon information retained in a buddy peer list (e.g., that may be included in data/information 1522 of memory 1508 when employing an irreversible function).

Figure 16:
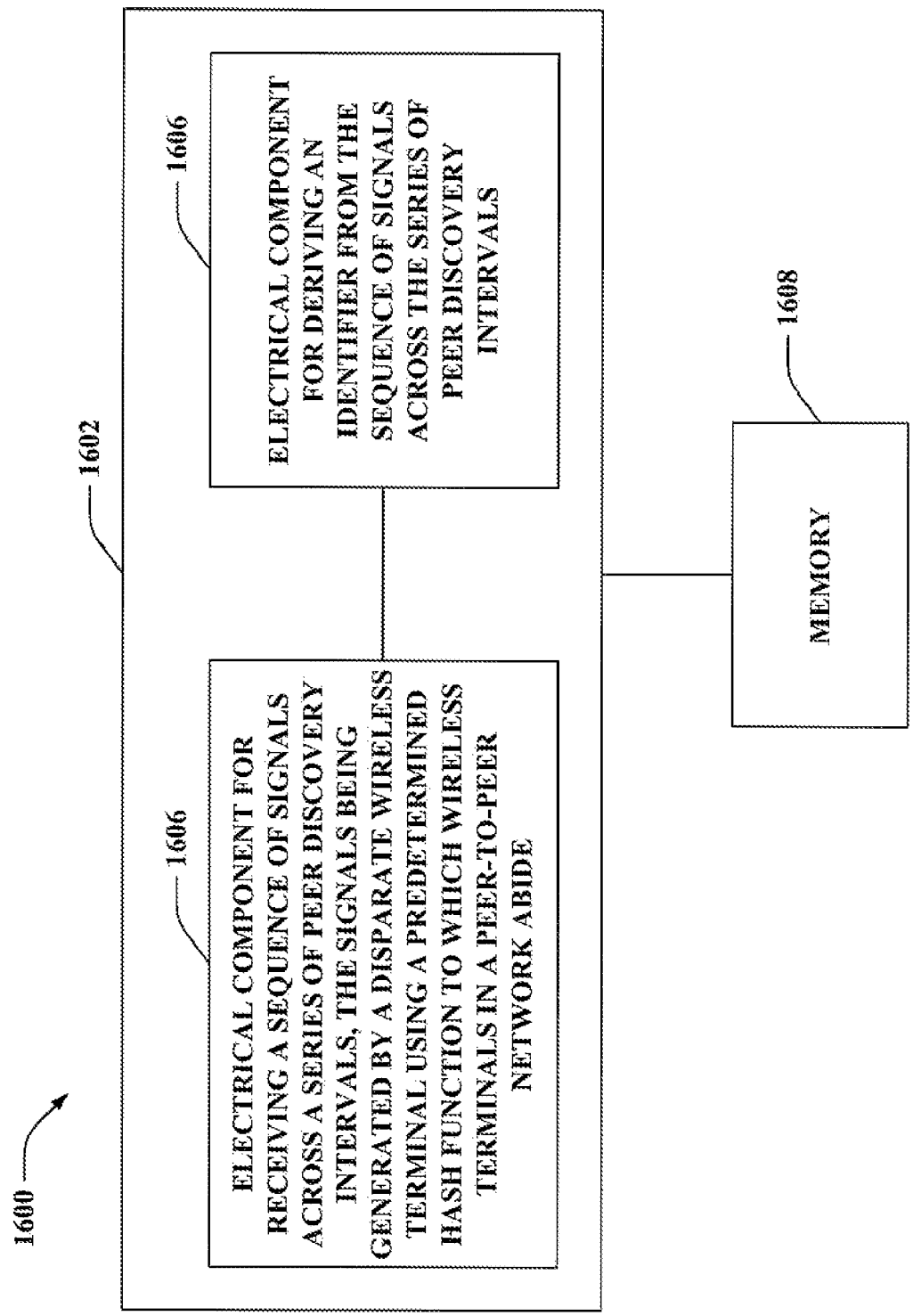
FIG. 16 is an illustration of an example system that enables utilizing a reversible function in connection with peer discovery signals in a peer-to-peer network.

With reference to FIG. 16, illustrated is a system 1600 that enables utilizing a reversible function in connection with peer discovery signals in a peer-to-peer network. For example, system 1600 may reside at least partially within a wireless terminal. It is to be appreciated that system 1600 is represented as including functional blocks, which may be functional blocks that represent functions implemented by a processor, software, or combination thereof (e.g., firmware). System 1600 includes a logical grouping 1602 of electrical components that can act in conjunction. For instance, logical grouping 1602 may include an electrical component for receiving a sequence of signals across a series of peer discovery intervals, the signals being generated by a peer using a predetermined hash function to which peers in a peer-to-peer network abide 1604. For example, the predetermined hash function may be a reversible function that may enable generating the sequence of signals based upon the identifier and/or a value of a time counter variable (e.g., associated with a time of a peer discovery interval). Further, logical grouping 1602 may comprise an electrical component for deriving an identifier from the sequence of signals across the series of peer discovery intervals 1606. Pursuant to an example, each of the signals may include information pertaining to linking that signal with other signals in the sequence and/or information related to a portion of the identifier. Moreover, a disparate sequence of signals may be generated and/or transmitted across peer discovery intervals to peers. Additionally, system 1600 may include a memory 1608 that retains instructions for executing functions associated with electrical components 1604 and 1606. While shown as being external to memory 1608, it is to be understood that one or more of electrical components 1604 and 1606 may exist within memory 1608.

Figure 17:
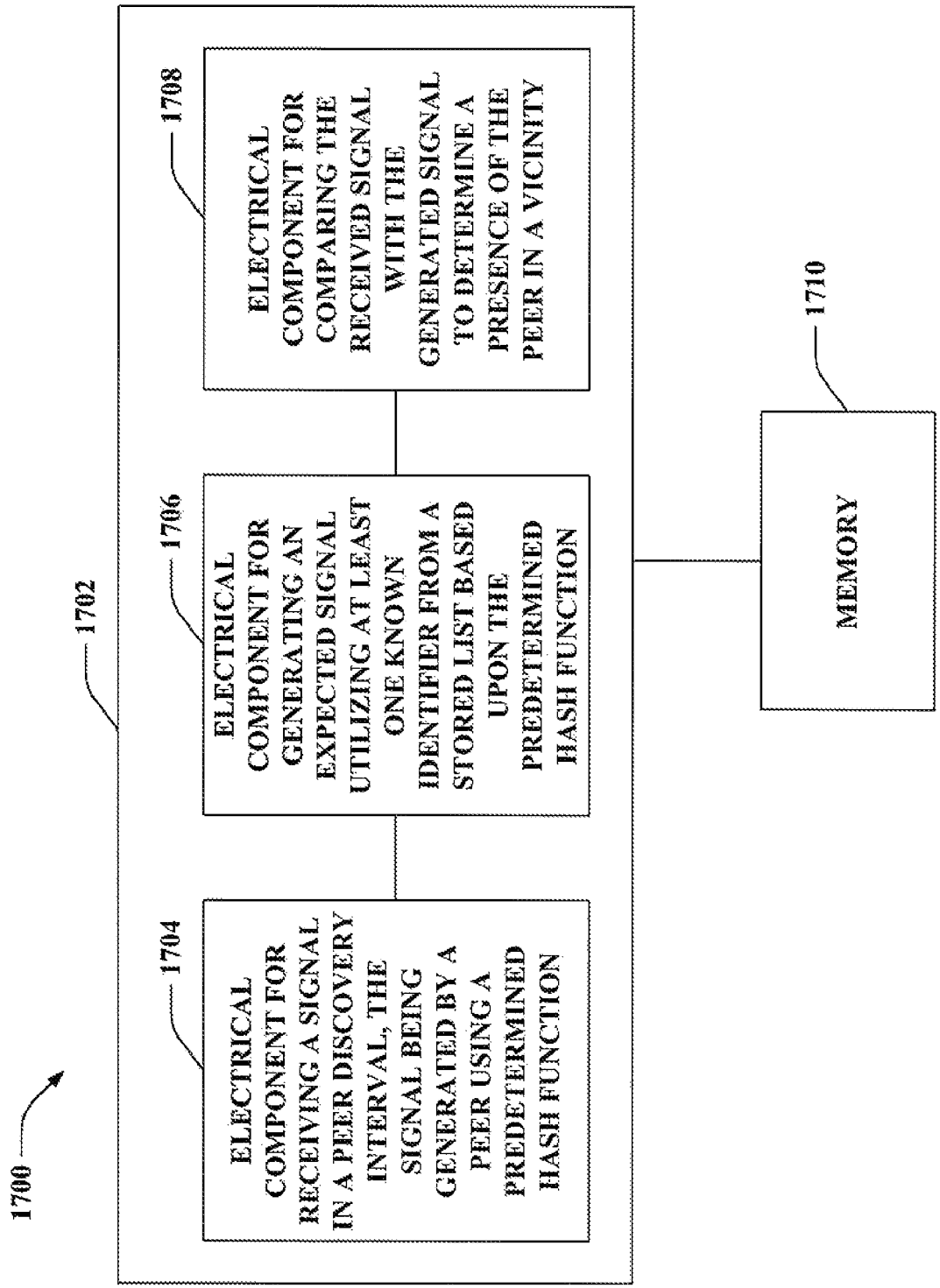
FIG. 17 is an illustration of an example system that enables utilizing an irreversible function in connection with encoding and/or decoding peer discovery signals in a peer-to-peer network.

With reference to FIG. 17, illustrated is a system 1700 that enables utilizing an irreversible function in connection with encoding and/or decoding peer discovery signals in a peer-to-peer network. System 1700 may reside at least partially within a wireless terminal, for instance. It is to be appreciated that system 1700 is represented as including functional blocks, which may be functional blocks that represent functions implemented by a processor, software, or combination thereof (e.g., firmware). System 1700 includes a logical grouping 1702 of electrical components that can act in conjunction. For instance, logical grouping 1702 may include an electrical component for receiving a signal in a peer discovery interval, the signal being generated by a peer using a predetermined hash function 1704. For example, the predetermined hash function may be an irreversible function that may be commonly known and employed in the peer-to-peer network. Further, logical grouping 1702 may comprise an electrical component for generating an expected signal utilizing at least one known identifier from a stored list based upon the predetermined hash function 1706. Moreover, logical grouping 1702 may include an electrical component for comparing the received signal with the generated signal to determine a presence of the peer in a vicinity 1708. For example, Additionally, system 1700 may include a memory 1710 that retains instructions for executing functions associated with electrical components 1704, 1706, and 1708. While shown as being external to memory 1710, it is to be understood that one or more of electrical components 1704, 1706, and 1708 may exist within memory 1710.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a communication device in a peer-to-peer network, comprising:
   receiving a first peer discovery signal in a first peer discovery interval of a series of peer discovery intervals occurring in said peer-to-peer network, wherein the first peer discovery signal is generated by a first wireless terminal using a predetermined hash function;
   generating an expected signal using a known identifier from a stored list of known identifiers based on the predetermined hash function which uses as inputs said known identifier and a hash function input value corresponding to the first peer discovery interval in which the first peer discovery signal was received, said hash function input value varying as a function of time between successive peer discovery intervals; and
   generating a first value which is a probability that a wireless terminal corresponding to the known identifier used to generate the expected signal is present in a vicinity of the communication device, said generating a first value including comparing the received first peer discovery signal with the generated expected signal to determine a presence of the first wireless terminal corresponding to the known identifier in a vicinity.

2. The method of claim 1,
   wherein the first wireless terminal corresponds to the known identifier used to generate the expected signal; and
   wherein generating a first value includes generating said first value as a function of an energy level of the received first peer discovery signal, the generated first value being higher for a first energy level than for a second energy level which is lower than said first energy level.

3. The method of claim 2, further comprising:
   receiving a second signal from a signal source, wherein the signal source includes one of a base station, an access node, or a satellite;
   deriving timing information from the second signal;
   determining time positions of the peer discovery intervals from the derived timing information;
   wherein said hash function input value which varies as a function of time is a time counter variable, the method further comprising:
   receiving a third signal from the signal source; and
   deriving said time counter variable from the third signal, wherein a value of the time counter variable varies between two successive peer discovery intervals based on a predetermined function.

4. The method of claim 3, wherein each of the peer discovery intervals includes a plurality of symbols and each of the plurality of symbols includes a plurality of tones and the first peer discovery signal includes one or a plurality of beacon signals, wherein each beacon signal includes one tone in one symbol period and a received power of the tone is at least 5 dB higher than an average per-tone power of other tones in the same symbol period.

5. The method of claim 4, further comprising
   determining at least one beacon signal is present in the first peer discovery interval;
   estimating an index of the symbol and an index of tone of the at least one beacon signal; and
   calculating an expected index of the symbol and an expected index of tone of a beacon signal using at least one of the known identifiers and the time counter variable based on the predetermined hash function.

6. The method of claim 1, wherein the first value is greater than zero.

7. The method of claim 1, further comprising
   receiving a second peer discovery signal in a second peer discovery interval, wherein the second peer discovery signal is generated by another wireless terminal using the predetermined hash function, the second peer discovery interval being different from the first peer discovery interval;
   generating a second expected signal using the known identifier based on the predetermined hash function;
   comparing the received second peer discovery signal with the generated second expected signal;
   increasing the first value of the probability that the wireless terminal corresponding to the known identifier is present in the vicinity if i) the comparison result indicates that the received second peer discovery signal is substantially similar to the generated second expected signal and ii) the probability is less than 1; and decreasing the first value of the probability that the wireless terminal corresponding to the known identifier is present in the vicinity if the comparison result indicates that the received second peer discovery signal is different from the generated second expected signal.

8. The method of claim 1, further comprising:
evaluating an energy level of the received first peer discovery signal; and
determining the first value of the probability based upon the energy level.

9. The method of claim 1, further comprising determining a known peer is within the peer-to-peer network when the received first peer discovery signal matches the generated expected signal corresponding to the known identifier of the known peer.

10. The method of claim 1, further comprising determining a known peer is outside of the peer-to-peer network when the received first peer discovery signal does not match the generated expected signal corresponding to the known identifier of the known peer.

11. The method of claim 10, further comprising discarding the received first peer discovery signal if the received first signal does not match the generated expected signal corresponding to any of the known identifiers.

12. A wireless communications apparatus, comprising:
a memory that retains a list of known identifiers and instructions related to obtaining a first peer discovery signal in a peer discovery interval of a series of peer discovery intervals occurring in a peer-to-peer network, wherein the first peer discovery signal is generated by a first wireless terminal using a predetermined hash function, generating an expected signal utilizing a known identifier from said list of known identifiers based on the predetermined hash function which uses as inputs said known identifier and a hash function input value corresponding to the first peer discovery interval in which the first peer discovery signal was received, said hash function input value varying as a function of time between successive peer discovery intervals, and generating a first value which is a probability that a wireless terminal corresponding to the known identifier used to generate the expected signal is present in a vicinity of the communication apparatus, said generating a first value including comparing the obtained first peer discovery signal with the generated expected signal to determine a presence of the wireless terminal corresponding to the known identifier in a vicinity; and
a processor, coupled to the memory, configured to execute the instructions retained in the memory.

13. The wireless communications apparatus of claim 12, wherein the first wireless terminal corresponds to the known identifier used to generate the expected signal; and
wherein generating a first value includes generating said first value as a function of an energy level of the received first peer discovery signal, the generated first value being higher for a first energy level than for a second energy level which is lower than said first energy level.

14. The wireless communications apparatus of claim 13, wherein the memory further retains instructions for deriving timing information from a second signal received from one or more of a base station, an access node, or a satellite, and determining a time position of the peer discovery interval from the derived timing information;
wherein said hash function input value which varies as a function of time is a time counter variable; and
wherein the memory further retains instructions for deriving said time counter variable that varies between successive peer discovery intervals from a third signal received from one or more of the base station, the access node, or the satellite.

15. The wireless communications apparatus of claim 14, wherein the peer discovery interval includes a plurality of symbols and each of the plurality of symbols includes a plurality of tones and the first peer discovery signal includes one or a plurality of beacon signals wherein each beacon signal includes one tone in one symbol period and a received power of the tone is at least 5 dB higher than an average per-tone power of other tones in the same symbol period.

16. The wireless communications apparatus of claim 15, wherein the memory further retains instructions for estimating a symbol index and a tone index of a received beacon signal included in said first peer discovery signal and evaluating an expected symbol index and an expected tone index utilizing one of the known identifier and the time counter variable based upon the predetermined hash function.

17. The wireless communications apparatus of claim 12, wherein the first value is greater than zero.

18. The wireless communications apparatus of claim 12, wherein the memory further retains instructions for increasing the first value when the expected signal generated from the known identifier matches a differing received signal during a differing peer discovery interval.

19. The wireless communications apparatus of claim 12, wherein the memory further retains instructions for analyzing an energy level of the received first peer discovery signal, and determining the first value of the probability based upon the energy level.

20. The wireless communications apparatus of claim 12, wherein the memory further retains instructions for determining a known peer is within the peer-to-peer network when the received first peer discovery signal matches the generated expected signal corresponding to the known identifier of the known peer.

21. The wireless communications apparatus of claim 12, wherein the memory further retains instructions for determining a known peer is outside of the peer-to-peer network when the received first peer discovery signal does not match the generated expected signal corresponding to the known identifier of the known peer and discarding the received first peer discovery signal if the received first peer discovery signal does not match the generated expected signal corresponding to any of the known identifiers.

22. A wireless communications apparatus that enables utilizing an irreversible function in connection with encoding and/or decoding peer discovery signals in a peer-to-peer network, comprising:
means for receiving a first peer discovery signal in a first peer discovery interval, the first peer discovery signal being generated by a first wireless terminal using a predetermined hash function;
means for generating an expected signal utilizing a known identifier from a stored list based upon the predetermined hash function which uses as inputs said known identifier and a hash function input value corresponding to the first peer discovery interval in which the first peer discovery signal was received, said hash function input value varying as a function of time between successive peer discovery intervals; and means for generating a first value which is a probability that a wireless terminal corresponding to the known identifier used to generate the expected signal is present in a vicinity of the communication apparatus, said means for generating a first value including means for comparing the received signal with the generated signal to determine a presence of the wireless terminal corresponding to the known identifier in a vicinity.

23. The wireless communications apparatus of claim 22, wherein the first wireless terminal corresponds to the known identifier used to generate the expected signal; and
wherein generating a first value includes generating said first value as a function of an energy level of the received first peer discovery signal, the generated first value being higher for a first energy level than for a second energy level which is lower than said first energy level.

24. The wireless communications apparatus of claim 23, further comprising means for deriving timing information from a second signal received from one or more of a base station, an access node, or a satellite, and determining a time position of the peer discovery interval from the derived timing information;
wherein said hash function input value which varies as a function of time is a time counter variable, the wireless communications apparatus further comprising:
means for deriving said time counter variable that varies between successive peer discovery intervals from a third signal received from one or more of the base station, the access node, or the satellite.

25. The wireless communications apparatus of claim 24, wherein the peer discovery interval includes a plurality of symbols and each of the plurality of symbols includes a plurality of tones and the first peer discovery signal includes one or a plurality of beacon signals wherein each beacon signal includes one tone in one symbol period and a received power of the tone is at least 5 dB higher than an average per-tone power of other tones in the same symbol period.

26. The wireless communications apparatus of claim 25, further comprising:
means for estimating a symbol index and a tone index of a received beacon signal included in said first peer discovery signal; and
means for evaluating an expected symbol index and an expected tone index utilizing at least one of the known identifier and the time counter variable based upon the predetermined hash function.

27. The wireless communications apparatus of claim 22, wherein the first value is greater than zero.

28. The wireless communications apparatus of claim 22, further comprising means for altering the value of the probability based upon repeated matching.

29. The wireless communications apparatus of claim 27, further comprising means for assigning the value of the probability based upon a received energy level.

30. A non-transitory machine-readable medium having stored thereon machine-executable instructions for controlling a communications device in a peer to peer network to:
obtain a first peer discovery signal generated by a first wireless terminal using a predetermined hash function;
generate an expected signal utilizing a known identifier from a list of known identifiers based on the predetermined hash function which uses as inputs said known identifier and a hash function input value corresponding to the first peer discovery interval in which the first peer discovery signal was received, said hash function input value varying as a function of time between successive peer discovery intervals; and
generate a first value which is a probability that a wireless terminal corresponding to the known identifier used to generate the expected signal is present in a vicinity of the communication device, said generating a first value including comparing the obtained signal with the generated expected signal to determine a presence of the wireless terminal corresponding to the known identifier in a vicinity.

31. The non-transitory machine-readable medium of claim 30,
wherein the first wireless terminal corresponds to the known identifier used to generate the expected signal; and
wherein generating a first value includes generating said first value as a function of an energy level of the received first peer discovery signal, the generated first value being higher for a first energy level than for a second energy level which is lower than said first energy level.

32. The non-transitory machine-readable medium of claim 31, further comprising machine-executable instructions for controlling said communications device to determine a time position for a peer discovery interval during which the signal is obtained based upon received timing information;
wherein said hash function input value which varies as a function of time is a time counter variable, the non-transitory machine-readable medium further comprising machine-executable instructions for controlling said communications device to determine said time counter variable that changes between successive peer discovery intervals.

33. The non-transitory machine-readable medium of claim 32, wherein the probability is greater than zero.

34. The non-transitory machine-readable medium of claim 32, further comprising machine-executable instructions for controlling said communications device to determine a known peer from the list is within the peer-to-peer network when the obtained first peer discovery signal matches the generated expected signal corresponding to the known identifier of the known peer.

35. The non-transitory machine-readable medium of claim 32, further comprising machine-readable instructions for controlling said communications device to determine a known peer is outside of the peer-to-peer network when the first peer discovery signal fails to match the generated expected signal corresponding to the known identifier of the known peer.

36. In a wireless communication system, an apparatus comprising:
a processor configured to:
detect a first peer discovery signal in a peer discovery interval of a series of peer discovery intervals occurring in a peer-to-peer network, wherein the first peer discovery signal is generated by a first wireless terminal using a predetermined hash function;
generate an expected signal using a known identifier from a stored list of known identifiers based on the predetermined hash function which uses as inputs said known identifier and a hash function input value corresponding to the first peer discovery interval in which the first peer discovery signal was received, said hash function input value varying as a function of time between successive peer discovery intervals; and
generate a first value which is a probability that a wireless terminal corresponding to the known identifier used to generate the expected signal is present in a vicinity of the communication device, said processor being further configured to compare the first peer discovery signal with the generated expected signal to determine a presence of the wireless terminal corresponding to the known identifier in a vicinity, wherein the first wireless terminal corresponds to the known identifier used to generate the expected signal.

37. The method of claim 1,
wherein said first wireless terminal is a mobile handheld device.

38. The method of claim 1, wherein said peer discovery intervals are intervals during which wireless terminals in said peer-to-peer network detect and identify each other.

39. The method of claim 1, wherein said hash function input value which varies as a function of time remains constant during said first peer discovery interval.

40. The method of claim 39, wherein said hash function input value which varies as a function of time changes from one peer discovery interval to next peer discovery interval in said series of peer discovery intervals.

* * * * *